(12) United States Patent
Kiasaleh

(10) Patent No.: US 6,373,862 B1
(45) Date of Patent: Apr. 16, 2002

(54) CHANNEL-AIDED, DECISION-DIRECTED DELAY-LOCKED LOOP

(75) Inventor: Kamran Kiasaleh, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/210,429

(22) Filed: Dec. 11, 1998

Related U.S. Application Data

(60) Provisional application No. 60/069,685, filed on Dec. 12, 1997.

(51) Int. Cl.[7] .................... H04B 7/216; A61F 2/06; H04L 27/30

(52) U.S. Cl. .................. 370/515; 375/145; 375/149; 375/367; 370/519

(58) Field of Search ................ 370/342, 320, 370/335, 441, 479, 491, 512, 515, 516, 517, 519, 333, 513, 514, 518; 375/130, 134, 136, 137, 142, 143, 147, 150, 152, 149, 145, 367

(56) References Cited

U.S. PATENT DOCUMENTS

| | | | | |
|---|---|---|---|---|
| 5,659,573 A | * | 8/1997 | Bruckert et al. | 375/142 |
| 5,717,713 A | * | 2/1998 | Natali | 375/149 |
| 5,781,584 A | * | 7/1998 | Zhou et al. | 375/150 |
| 5,818,868 A | * | 10/1998 | Gaudenzi et al. | 375/152 |
| 5,875,218 A | * | 2/1999 | Barham et al. | 375/376 |
| 6,167,037 A | * | 12/2000 | Higuchi et al. | 370/335 |

OTHER PUBLICATIONS

"Decision–Directed Coherent Delay–Lock Tracking Loop for DS–Spread–Spectrum Signals," Gaudenzi, et. al., *IEEE Transactions on Communications*, vol. 39, No. 5, 05/91, pp. 758–765.

"Performance Evaluation for Phase–Coded Spread–Spectrum Multiple–Access Communication—Part I: System Analysis," Michael B. Pursley, *IEEE Transactions On Communications*, vol. COM–25, No. 8, 08/77, pp. 795–799.

"Propagation Characteristics on Microcellular Urban Mobile Radio Channels at 910 MHz," Bultitude, et. al., *IEEE Journal On Selected Areas in Communications*, vol. 7, No. 1 01/89, pp. 31–39.

* cited by examiner

*Primary Examiner*—Sceuia S. Rao
*Assistant Examiner*—Phirin Sam
(74) *Attorney, Agent, or Firm*—Pedro P. Hernandez; W. James Brady, III; Frederick J. Telecky, Jr.

(57) ABSTRACT

The present invention is a channel-aided, decision-directed delay-locked loop (CADD-DLL) implemented, in one embodiment of the present invention, for pilot-symbol-aided (PSA) code-division multiple-access (CDMA) communication. In one embodiment of the present invention initial pseudo-noise (PN) code acquisition is accomplished with the aid of a conventional non-coherent PN code acquisition system, and, upon acquiring the initial PN code epoch, PN code tracking is performed using a channel-aided, decision-directed PN code tracking mechanism. The tracking loop in accordance with the present invention includes delay and advance PN correlators. The correlators are followed by data and phase correction as well as amplitude matching devices, the outputs of which are subtracted to form an error signal for code tracking purposes.

2 Claims, 6 Drawing Sheets

CHANNEL-AIDED, DECISION-DIRECTED DELAY-LOCKED LOOP

This amendment claims priority under 35 USC §119(e)(1) of provisional application No. 60/069,685, filed Dec. 12, 1997.

TECHNICAL FIELD OF THE INVENTION

This invention relates generally to data communications and more specifically to a method and system for synchronization and clock recovery.

BACKGROUND OF THE INVENTION

CDMA communication systems rely heavily on the accuracy of PN code acquisition and tracking loops to establish communication. In the absence of phase, frequency, and timing information, any PN code acquisition system must employ a non-coherent strategy to achieve PN code synchronization at the receiver. Typically, upon acquiring the initial epoch of the received PN code, the tracking phase of PN code synchronization is initiated. Historically, this phase of the code synchronization has been accomplished using a non-coherent mechanism that is insensitive to phase, frequency, as well as to the modulation that is typically imposed on the received PN code [See M. K. Simon, J. K. Omura, R. A. Scholtz, and B. K. Levitt. *Spread Spectrum Communications*, volume III. Computer Science Press, Rockville, Md. (hereinafter referred to as "Simon, et al.")], although a coherent version of PN code tracker has also been investigated. In a recent study, a decision-directed coherent DLL was proposed and investigated [See R. D. Gaudenzi and M. Luise. Decision-directed coherent delay-lock tracking for ds-spread-spectrum signals. *IEEE Transactions on Communications*, 39:758–765, May, 1991 (hereinafter referred to as "Gaudenzi, et al.")]. It was, subsequently, demonstrated that the overall loop performance is superior to a non-data-aided DLL. However, to the best of the authors' knowledge, a channel-aided, decision-directed DLL has never been investigated when multi-user interference, frequency-selective Rayleigh fading, and log-normal shadowing are present. It is important to note that this study is different from its predecessor in a number of ways. First, a general M-ary phase shift keying (MPSK) modulation is considered, whereas binary PSK signaling is analyzed in Gaudenzi, et al. Second, we consider a complex PN spreading scenario here. Third, we consider a scenario wherein, in addition to phase synchronization, an amplitude estimation and matching is performed. This action will enhance the performance of the tracking loop when the desired signal that we intend to track is impaired by fading, noise, or interference. Finally, the analysis in Gaudenzi, et al. considers either an non-return-to-zero (NRZ) or a bi-$\phi$ chip pulse shape, whereas we consider the commonly used square-root raised cosine pulse shaping here.

The motivation for this invention stems from the fact that several proposals for future CDMA wireless systems have suggested a pilot-symbol-aided (PSA) mechanism for channel estimation. This, in turn, allows for a coherent reception in the face of fast channel fading in the uplink as well as in the down link of a wireless system. Since data detection is performed in the presence of channel estimation, one can use the combined channel and data information to realize a channel-aided, decision-directed delay-locked loop (CADD-DLL). More important, in a wireless CDMA environment, the received signal is corrupted by frequency-selective Rayleigh fading, log-normal shadowing, and user-induced interference, and hence a meaningful analysis must consider these impairments into account. The frequency selective Rayleigh fading in a CDMA environment results in the presence of a number of signal components which appear as the delayed versions of the original signal with random (complex) amplitudes. The presence of such complex multiplicative distortions (MD), which may be modeled as independent, bandlimited complex Gaussian processes, hampers coherent communication when the Doppler rate is comparable to the desired coherence interval (which is typically the symbol duration) of the signal.

In this invention, then, we are concerned with the problem of PN code tracking when a PSA scenario is considered and when the demodulated data and channel MD estimates are used to remove modulation and to compensate for the channel MD so that a CADD-DLL PN code tracking system can be realized. We conjecture that, for a reasonable level of signal-to-noise ratio (SNR), the data errors are rather infrequent, leading to a PN code tracking performance that is superior to its conventional counterpart.

SUMMARY OF THE INVENTION

The present invention is a channel-aided, decision-directed delay-locked loop (CADD-DLL). One embodiment of the present invention is implemented for pilot-symbol-aided (PSA) code-division multiple-access (CDMA) communication. In one embodiment of the present invention initial pseudo-noise (PN) code acquisition is accomplished with the aid of a conventional non-coherent (signal not in frequency and phase alignment) PN code acquisition system, and, upon acquiring the initial PN code epoch (the code repeat time interval), PN code tracking is performed using a channel-aided, decision-directed PN code tracking mechanism. The tracking loop in accordance with the present invention includes delay and advance PN correlators. The correlators are followed by data and phase correction as well as amplitude matching devices, the outputs of which are subtracted to form an error signal for code tracking purposes. The performance of the proposed tracking loop is assessed in terms of the variance of PN code tracking error and the mean-time-to-loss (MTTL) for a frequency-selective Rayleigh fading channel in the presence of user-induced interference and log-normal shadowing. It is demonstrated that the impact of the decision-directed mechanism on the performance is to reduce the variance of timing error for moderate levels of signal-to-noise ratio as compared to the conventional non-coherent delay-locked loop (NC-DLL) tracking mechanism. Also, the MTTL is shown to be highly dependent on the mobile's Doppler shift.

These and other features of the invention that will be apparent to those skilled in the art from the following detailed description of the invention, taken together with the accompanying drawings.

DETAILED DESCRIPTION OF THE INVENTION

Figure 1:
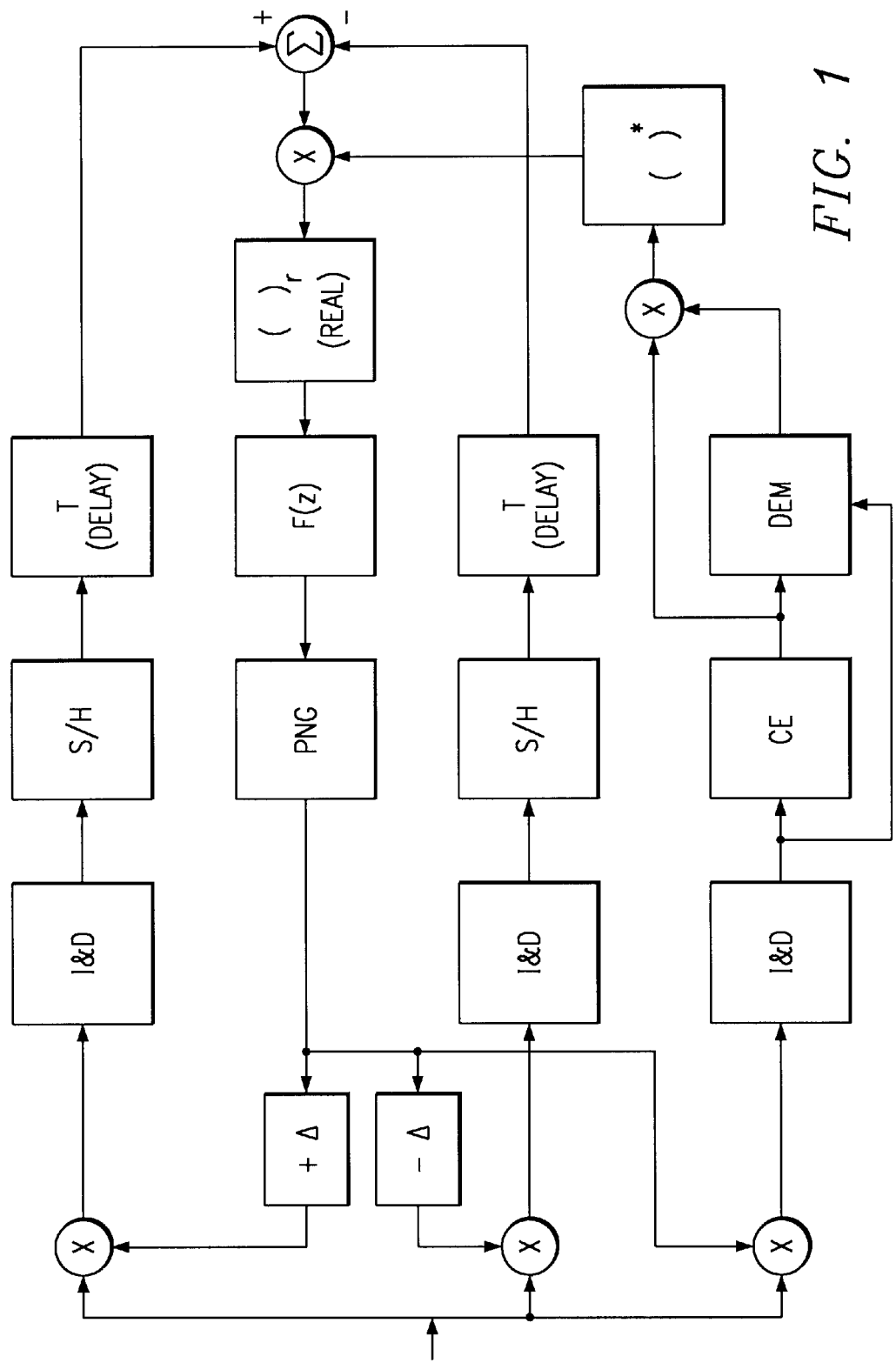
FIG. 1 is a block diagram of a channel-aided decision-directed delay-locked loop in accordance with the present invention.

We consider a conventional CDMA system with complex PN spreading. This receiver is depicted in FIG. 1. We also assume that initial PN code acquisition has been achieved with the aid of a non-coherent acquisition technique, see [Simon, et al., page 16]. This process, in turn, yields an accurate estimate of data symbol timing, since timing error is limited to a small fraction of a chip interval. In addition, since the cycles of the PN code may be synchronized with the occurrence time of the pilot symbols, the PN code acquisition also reveals PSA frame timing. Hence, no separate frame timing acquisition is required. We also assume a multipath channel, resulting in a received signal that comprises of not only a strong component, but also of a number of multipath signals.

In view of the above, let us begin by describing the received signal for a CDMA. In particular, we are interested in recovering the jth CDMA signal. Note that for the reverse link of a mobile system, the jth signal refers to the signal from the jth mobile user. For the forward link, the jth signal corresponds to the signal in the jth CDMA "channel." In this analysis, we limit ourselves to the forward link of a CDMA system.

For all intends and purposes, one can describe the complex envelope of the received signal in a CDMA environment impaired by multipath and interference as $$\tilde{x}(t) = \sum_{l=1}^{s_j} d_j(t - \tau_{j,l}(t)) c_{j,l}(t - \tau_{j,l}(t)) PN_j(t - \tau_{j,l}(t)) + I_j(t) + \tilde{z}(t) \quad (1)$$

where $\tilde{x}(t)$ is the complex envelop of the received CDMA signal, $$d_j(t - \tau_{j,l}(t)) = \sum_{n=-\infty}^{\infty} d_n^{(j)} P(t - nT_s - \tau_{j,l}(t))$$

is the data bearing portion of the jth signal via the lth multipath with $d_n^{(j)}$, $\tau_{j,l}(t)$ and $P(t)$ denoting the data symbol for the jth transmitted signal in nth signaling interval taking on an MPSK signaling constellation, the time varying propagation delay for the lth path of the jth signal when there are $s_j$ significant multipath for the jth signal, and a unit amplitude non-return-to-zero (NRZ) pulse shape of duration $T_s$, respectively. Moreover, $c_{j,l}(t)$ denotes the channel multiplicative distortion (MD) for the lth path of the jth signal (the received power due to an interfering signal is represented implicitly using $c_{j,l}(t)$), modeled as a narrowband process with a bandwidth identical to the Doppler spread of the mobile channel, $PN_j(t-\tau_{j,l})$ denotes the delayed version of the jth complex PN signal, and $\tilde{z}(t)$ is a complex baseband Gaussian random process whose real and imaginary parts are zero mean, independent Gaussian random processes with two-sided power spectral density levels of $$\frac{N_0}{2}$$

watts/Hz. Since the range rate remains rather small as compared to other parameters (chip rate, etc.), one can assume that $\tau_{j,l}(t)=\tau_{j,l}$. It is assumed here that $c_{j,l}(t)$'s are mutually independent random processes for all j and l. In (1), we have also introduced $I_j(t)$ as the interference for the jth signal, given by $$I_j(t) = \sum_{k=1; k \neq j}^{N_u} \sum_{q=1}^{s_k} d_k(t - \tau_{k,q}) c_{k,q}(t - \tau_{k,q}) PN_k(t - \tau_{k,q}) \quad (2)$$

In Equation (2), $N_u$ denotes the total number of interfering signals. Since a forward mobile link is of interest, $N_u$ may be used to denote the number of interfering base stations. The complex spreading signal in Equations (1) and (2) may be defined as $$PN_k(t - \tau_{k,q}) = \quad (3)$$

$$\sum_{n=-\infty}^{\infty} s_{n,I}^{(k)} P_c(t - nT_c - \tau_{k,q}) + j \sum_{n=-\infty}^{\infty} s_{n,Q}^{(k)} P_c(t - nT_c - \tau_{k,q})$$

where $j=\sqrt{-1}$, $s_{n,I}^{(k)}$ and $s_{n,Q}^{(k)}$ are the inphase (I) and quadrature (Q) phase, respectively, pseudorandom real spreading sequences for the nth chip interval of the kth user, $P_c(t)$ is the chip pulse shape, typically assumed to be a square root raised-cosine pulse shape, and $T_c$ is the chip interval given by $T_s/P_g$, where $P_g$ denotes the processing gain for the CDMA system. Note that we are concerned with the forward path of a CDMA system, and hence no offset spreading is considered.

Since a frequency selective channel is considered here, as shown above, one can model the impact of fading as independent MD's for each path of the signal. It is well-known that such MD processes have auto-correlation functions that satisfy (assuming no log-normal shadowing) [see Kamilo Feher. *Wireless Digital Communications-Modulation Spread Spectrum Applications*. Prentice-Hall, Upper Saddle River, N.J., 1995, pp. 76–78]

$$E\{c_{j,l}(t)c_{j,l}(t-\tau)^*|\sigma_{j,l}^2\} = \sigma_{j,l}^2 J_0(2\pi f_d^{(j,l)}\tau) e^{j2\pi f_e \tau} \quad (4)$$

with $x^*$, $\sigma_{j,l}^2$, $f_d^{(j,l)}$ and $f_e$ denoting the complex conjugate of x, the mean square value of the MD for the lth path of the jth signal, the maximum Doppler spread of the lth path of the jth signal, and the residual frequency error in Hz at the receiver, respectively. Moreover, $E\{(\ )|\sigma_{j,l}^2\}$ denotes the expected value of the enclosed conditioned on $\sigma_{j,l}^2$. Note that we have kept this analysis as general as possible to entertain the possibility of including a scenario where the desired and interfering users may be at different Doppler rates.

Since log-normal shadowing is also considered, we have $$\sigma_{j,l}^2 = P_{j,l} 10^{\zeta/10}$$

where $\zeta$ is a normal pdf (log-normal shadowing) with a zero mean and a standard deviation of $\sigma_\zeta$ (many field trials have shown $\sigma_\zeta$ to be in 4–8 dB [see R. J. C. Bultitude and G. K. Bedal. Propagation characteristics on microcellular urban mobile radio channels at 910 mhz. *IEEE Journal on Selected Areas in Communications*, 7:31–39, Jan. 1989. (hereinafter referred to as "Bultitude, et al.")] range for microcellular urban environment) and $P_{j,l}$ is the received power in the absence of shadowing for the lth path of the jth signal. Hence, the average power can be calculated using $$E_\zeta\{\sigma_{j,l}^2\} = \eta P_{j,l} \quad (5)$$

$$\eta = E_\zeta\{10^{\zeta/10}\} = \exp\left(\left(\frac{\ln(10)}{10}\right)^2 \frac{\sigma_\zeta^2}{2}\right) \text{ and } E_\zeta\{\ \}$$

enclosed with respect to $\zeta$. Hence, $$E\{c_{j,l}(t)c_{j,l}(t-\tau)^*\} = R_c^{(j,l)}(\tau) = \eta P_{j,l} J_0(2\pi f_d^{(j,l)}\tau)e^{j2\pi_e\tau} \quad (6)$$

Also, since uncorrelated fading is considered, $$E\{c_{j,l}(t)c_{m,n}(t-\tau)^*\} = R_c^{(j,l)}(\tau)\delta[j-m]\delta[l-n] \quad (7)$$

where $\delta[x] = \begin{cases} 1 & x=0 \\ 0 & \text{otherwise} \end{cases}$.

IV. CADD-DLL MODEL

As noted hereinabove, FIG. 1 depicts the proposed PN code tracking loop. For the most part, the tracking loop is identical to its non-coherent counterpart. The main difference is the absence of envelope detection at the output of the correlators in the delayed and advanced branches of the DLL. Note that a PSA scenario is considered, and hence a delay equivalent to the length of the PSA frame is needed. To elaborate, we consider the case where a known symbol is repeated every $LT_s$ sec, which leads to a scenario where a pilot symbol is followed by L−1 data symbols before the occurrence of the next pilot symbol. This implies an efficiency $$\frac{L-1}{L}$$

for the PSA signal. Hereafter, we refer to the $LT_s$ second frame as the PSA frame.

Considering that the initial PN code acquisition has been achieved, one can limit the timing error to a fraction of a chip interval. Without loss of generality, let us consider the case where we are interested in tracking the received PN code for the lth path of the jth signal (the strongest path). Then, the output of the advanced and delayed PN correlators/integrate&dump (ID) device tuned (where the word 'tuned' is used to refer to the state of a CDMA system; that is, when the jth PN code is correlated with the received signal, one can assume that the CDMA receiver has been tuned to the jth CDMA channel) to the lth path of the jth signal for the mth observation interval may be described as $$r_{j,l,m}^+ = \int_{(m-1)T_s+\hat{\tau}_{j,l}+\frac{T_c}{2}}^{(m)T_s+\hat{\tau}_{j,l}+\frac{T_c}{2}} \tilde{x}(t) PN_j^*\left(t - \hat{\tau}_{j,l} - \frac{T_c}{2}\right) dt; m=1,2,\ldots, \quad (8)$$

$$r_{j,l,m}^- = \int_{(m-1)T_s+\hat{\tau}_{j,l}-\frac{T_c}{2}}^{(m)T_s+\hat{\tau}_{j,l}-\frac{T_c}{2}} \tilde{x}(t) PN_j^*\left(t - \hat{\tau}_{j,l} + \frac{T_c}{2}\right) dt; m=1,2,\ldots, \quad (9)$$

where $\hat{\tau}_{j,l}$ is the estimate of $\tau_{j,l}$. If one assumes $\hat{\tau}_{j,l}=0$, then $\tau_{j,l}$ may be considered as the residual timing error, confined to $$\left[-\frac{T_c}{2}, \frac{T_c}{2}\right].$$

Let us define the following parameters:

$$\Gamma_{j,k,m,1}^\pm(t_1,t_2) = \int_{(m-1)T_s+t_2\pm\frac{T_c}{2}}^{(m-1)T_s+t_1} PN_k(t-t_1)PN_j^*\left(t-t_2\mp\frac{T_c}{2}\right)dt; t_1 > t_2, \quad (10)$$

and $$\Gamma_{j,k,m,2}^\pm(t_1,t_2) = \int_{(m-1)T_s+t_1}^{(m)T_s+t_2\pm\frac{T_c}{2}} PN_k(t-t_1)PN_j^*\left(t-t_2\mp\frac{T_c}{2}\right)dt; t_1 > t_2. \quad (11)$$

Obviously, for j≠k and j=k, $\Gamma_{j,k,m,1}^\pm$ and $\Gamma_{j,k,m,2}^\pm$ reduce to partial cross-correlation of the jth and kth PN codes and the partial auto-correlation function of the jth PN code, respectively. Moreover, from a statistical standpoint, $\Gamma_{j,k,m,1}^\pm$ and $\Gamma_{j,k,m,2}^\pm$ are independent of m for long codes. In most commercial CDMA systems, the period of the PN code is far greater than the duration of a data symbol. Hence, an observation over a data symbol interval leads to a partial cross- or auto-correlation function whose statistical properties are only dependent on the structure of the code and the length of the observation interval as compared to the period of the code (i.e., the processing gain).

Substituting for $\tilde{x}(t)$ in Equations (8) and (9) using Equation (1) and carrying out the straightforward calculation, we arrive at $$r_{j,l,m}^\pm \approx C_{m-1}^{(j,l)} d_{M-1}^{(j)} \Gamma_{j,j,m,1}^\pm(\tau_{j,l}, \hat{\tau}_{j,l}) + \quad (12)$$

$$C_m^{(j,l)} d_m^{(j)} \Gamma_{j,j,m,2}^\pm(\tau_{j,l}, \hat{\tau}_{j,l}) +$$

$$\sum_{k=1;k\neq j}^{N_u} \sum_{q=1}^{s_k} C_{m-1}^{(k,q)} d_{l_{m,m,q}-1}^{(k)} \Gamma_{j,k,m,1}^\pm(\tau_{k,q}, \hat{\tau}_{j,l}) +$$

$$C_m^{(k,q)} d_{l_{k,m,q}}^{(k)} \Gamma_{j,k,m,2}^\pm(\tau_{k,q}, \hat{\tau}_{j,l}) +$$

$$\sum_{q=1;q\neq l}^{s_j} C_{m-1}^{(j,q)} d_{l_{j,m,q}-1}^{(j)} \Gamma_{j,j,m,1}^\pm(\tau_{j,q}, \hat{\tau}_{j,l}) +$$

$$C_m^{(j,q)} d_{l_{j,m,q}}^{(j)} \Gamma_{j,j,m,2}^\pm(\tau_{j,q}, \hat{\tau}_{j,l}) + n_{j,l,m}^\pm$$

where $C_{m-1}^{(\alpha,\beta)}$ and $C_{m-1}^{(\alpha,\beta)}$ are the channel MD, observed over the (m−1)th and mth observed intervals, respectively, for the βth path of the αth user, and $d_m^{(j)}$ is the mth data symbol for the jth signal. In arriving at the above, we have assumed that the receiver is not synchronized with the interfering signals from other base stations (forward link scenario), and hence the integration yields the $l_{k,m,q}$th and $(l_{k,m,q}-1)$th data symbols of the qth path of the kth signal (k≠j). Note that $l_{k,m,q}$ is a function of the path delay $\tau_{k,q}$ (and obviously m), and hence may be viewed as a uniformly distributed random variable over a range that is dependent upon the maximum relative propagation delay. In this analysis, however, we assume that this random variable may take on any integer value with equal probability. For k=j, since the receiver is tuned to the jth signal, $l_{j,m,q}$ is confined to a range that is determined by the maximum delay spread of the channel. If the delay spread of the channel is less than a data symbol duration, then $l_{j,m,q}=m$ for all q, and $l_{k,m,q}=l_{k,m}$. Also, $$n_{j,l,m}^\pm = \int_{(mL-1)T_s+\hat{\tau}_{j,l}\pm\frac{T_c}{2}}^{(mL)T_s+\hat{\tau}_{j,l}\pm\frac{T_c}{2}} \tilde{z}(t) PN_j^*\left(t - \hat{\tau}_{j,l} \mp \frac{T_c}{2}\right) dt \quad (13)$$

Note that, Equation (12) is only an approximation since the channel condition is considered to change over a symbol interval. For many practical applications, however, the channel Doppler shift is sufficiently small as compared to the symbol rate so that the characteristics of the channel remain constant over a given symbol interval. In that event, Equation (12) may be viewed as a good approximation.

Figure 2:
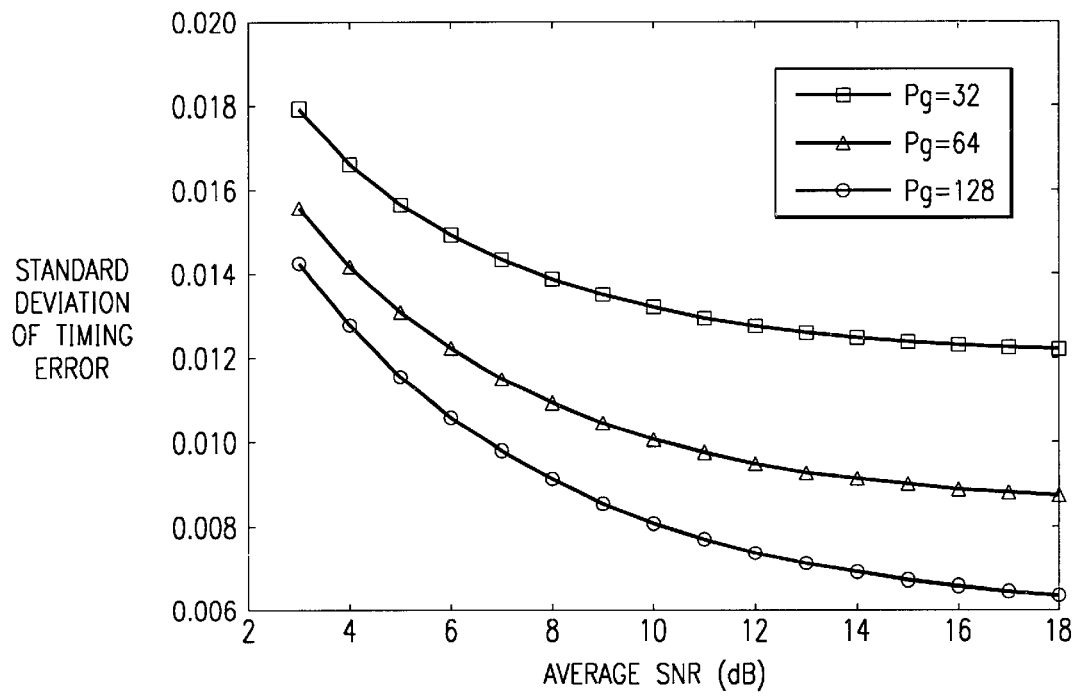
FIGS. 2–6 are graphs showing variance of timing error for the tracking loop of the channel-aided decision-directed delay-locked loop in accordance with the present invention under various conditions.

Subsequent to the delay and advance correlation, the tracking loop performs data removal and channel MD compensation operations (see FIG. 2). Since we intend to emphasize strong signals, the channel MD compensation involves phase correction and amplitude matching. That is, the tracking loop generates $$y_{j,l,m}^\pm = \left(\hat{C}_m^{(j,l)} \hat{d}_m^{(j)}\right)^* r_{j,l,m}^\pm \qquad (14)$$

where $\hat{d}_m^{(j)}$ and $\hat{C}_m^{(j,l)}$ are estimates of $d_m^{(j)}$ and $C_m^{(j,l)}$, respectively. It is imperative to note that we have not represented the delay element that is needed to operate a data-aided loop. That is, Equation (14) does not take the delay elements in the two branches of the loop in FIG. 2 into account. This is, fortunately, of little consequence for the ensuing steady-state analysis for which we assume a loop bandwidth far smaller than the symbol rate [see William C. Lindsey and Marvin K. Simon. *Telecommunication Systems Engineering*. Information and System Sciences. Prentice-Hall, Inc., 1973, pp. 531–532]. Hence, we proceed to perform the necessary analysis using Equation (14). Furthermore, it is assumed that $d_m^{(j)}$ takes on an MPSK signal constellation. Note that the complex conjugate operation for a constant envelope signaling results in the removal of data. Furthermore, the channel MD compensation is identical to a 'matched' filtering operation. Since in a multipath environment, the PN code acquisition model is designed to acquire the strongest signal component, the above approach enhances performance via emphasizing the strongest signal component. To simplify the ensuing analysis, we combine any term in Equation (12) that does not correspond to the useful signal or additive channel noise to a single term and refer to it as multi-user/multipath interference term. Hence, $$y_{j,l,m}^\pm = C_{m-1}^{(j,l)} d_{m-1}^{(j)} \left(\hat{d}_m^{(j)} \hat{C}_m^{(j,l)}\right)^* \Gamma_{j,j,m,1}^\pm(\tau_{j,l}, \hat{\tau}_{j,l}) + \qquad (15)$$
$$C_m^{(j,l)} d_m^{(j)} \left(\hat{d}_m^{(j)} \hat{C}_m^{(j,l)}\right)^* \Gamma_{j,j,m,2}^\pm(\tau_{j,l}, \hat{\tau}_{j,l}) n_{j,l,m}^\pm n_{j,l,m}^\pm +$$
$$\left(\hat{d}_m^{(j)} \hat{C}_m^{(j,l)}\right)^* I_{j,l,m}^\pm,$$

where $$I_{j,l,m}^\pm = \sum_{k=1;k\neq j}^{N_u} \sum_{q=1}^{s_k} C_{m-1}^{(k,q)} d_{l_k,m,q-1}^{(k)} \Gamma_{j,k,m,1}^\pm(\tau_{k,q}, \hat{\tau}_{j,1}) + \qquad (16)$$
$$C_m^{(k,q)} d_{l_k,m,q}^{(k)} \Gamma_{j,k,m,2}^\pm(\tau_{k,q}, \hat{\tau}_{j,l}) +$$
$$\sum_{q=1;q\neq l}^{s_j} C_{m-1}^{(j,q)} d_{l_j,m,q-1}^{(j)} \Gamma_{j,j,m,1}^\pm(\tau_{j,q}, \hat{\tau}_{j,l}) +$$
$$C_m^{(j,q)} d_{l_j,j,m,2}^{(j)} \Gamma_{j,j,m,2}^\pm(\tau_{j,q}, \hat{\tau}_{j,l}).$$

In the ensuing analysis, the statistical properties of $I_{j,l,m}^\pm$ are needed. Considering that data symbols are zero mean, i.i.d random variables, $$E\{I_{j,l,m}^\pm\} = 0.$$

Also, $$\sigma_{I^\pm}^2 = E\{|I_{j,l,m}^\pm|^2\} \qquad (17)$$
$$= \sum_{k=1;k\neq j}^{N_u} \sum_{q=1}^{s_k} \{E[|\Gamma_{j,k,m,1}^\pm(\tau_{k,q}, \hat{\tau}_{j,l})|^2] +$$
$$E[|\Gamma_{j,k,m,2}^\pm(\tau_{k,q}, \hat{\tau}_{j,l})|^2]\} R_c^{(k,q)}(0) +$$
$$\sum_{q=1;q\neq l}^{s_j} \{E[|\Gamma_{j,j,m,1}^\pm(\tau_{j,q}, \hat{\tau}_{j,l})|^2] +$$
$$E[|\Gamma_{j,j,m,2}^\pm(\tau_{j,q}, \hat{\tau}_{j,l})|^2]\} R_c^{(j,q)}(0)$$

where we have assumed independent, zero mean path fading. Namely, $E\{C_\alpha^{(j,q)} C_\beta^{(k,p)}\}=0$ for all $\alpha$, $\beta$, j and k, when $p\neq q$. Moreover, $E\{C_\alpha^{(j,q)} C_\beta^{(k,p)}\}=0$ for all $\alpha$, $\beta$, and $j\neq k$. The auto-correlation function of $I_{j,l,m}^\pm$ is also needed. With some effort, one can show that $$E\{(I_{j,l,m}^\pm(I_{j,l,m}^\pm))^*\} = \sigma_{I^\pm}^2 \delta[m-n] + \gamma_{I^\pm}^2 \delta[m-n+1] + \eta_{I^\pm}^2 \delta[m-n-1]$$

where $$\gamma_{I^\pm}^2 = \sum_{k=1;k\neq j}^{N_u} \sum_{q=1}^{s_k} E[(\Gamma_{j,k,m+1,1}^\pm(\tau_{k,q}, \hat{\tau}_{j,l}))^* \Gamma_{j,k,m,2}^\pm(\tau_{k,q}, \hat{\tau}_{j,l})] R_c^{(k,q)}(T_s) + \qquad (18)$$
$$\sum_{q=1;q\neq l}^{s_j} E[(\Gamma_{j,j,m+1,1}^\pm(\tau_{j,q}, \hat{\tau}_{j,l}))^* \Gamma_{j,j,m,2}^\pm(\tau_{j,q}, \hat{\tau}_{j,l})] R_c^{(j,q)}(T_s)$$

and $$\eta_{I^\pm}^2 = \sum_{k=1;k\neq j}^{N_u} \sum_{q=1}^{s_k} E[(\Gamma_{j,k,m-1,2}^\pm(\tau_{k,q}, \hat{\tau}_{j,l}))^* \Gamma_{j,k,m,1}^\pm(\tau_{k,q}, \hat{\tau}_{j,l})] R_c^{(k,q)}(T_s) + \qquad (19)$$
$$\sum_{q=1;q\neq l}^{s_j} E[(\Gamma_{j,j,m-1,2}^\pm(\tau_{j,q}, \hat{\tau}_{j,l}))^* \Gamma_{j,j,m,1}^\pm(\tau_{j,q}, \hat{\tau}_{j,l})] R_c^{(j,q)}(T_s)$$

In arriving at the above equations we have used the following identity: $1_{j,m\pm 1,q} = 1_{j,m,q}\pm 1$ and the fact that the residual frequency error is negligible, leading to a real auto-correlation function for the channel MD.

It is quite obvious that $I_{j,l,m}^\pm$ is a non-white random sequence. However, a major simplification can be made if one assumes a scenario where the PN codes used possess a large period and when the processing gain is sufficiently large. In that event, the partial out-of-phase auto-correlation and partial cross-correlation functions of the PN codes observed over non-overlapping time frames form independent, zero mean random variables. That is, $$E[(\Gamma_{j,k,m,2}^\pm(\tau_{k,q}, \hat{\tau}_{j,l}))^* \Gamma_{j,k,n,1}^\pm(\tau_{k,q}, \hat{\tau}_{j,l})] \approx \qquad (20)$$
$$E[(\Gamma_{j,k,m,2}^\pm(\tau_{k,q}, \hat{\tau}_{j,l}))^* \Gamma_{j,k,n,1}^\pm(\tau_{k,q}, \hat{\tau}_{j,l})]; \quad n = m \pm 1$$

and $$E[\Gamma_{j,k,m,1}^\pm(\tau_{k,q}, \hat{\tau}_{j,l})] = E[\Gamma_{j,k,m,2}^\pm(\tau_{k,q}, \hat{\tau}_{j,l})] \approx 0 \qquad (21)$$

for all m, j, k and $q\neq l$. Also, $$E[\Gamma_{j,k,m,1}^\pm(\tau_{k,l}, \hat{\tau}_{j,l})] = E[\Gamma_{j,k,m,2}^\pm(\tau_{k,l}, \hat{\tau}_{j,l})] \approx 0 \qquad (22)$$

when $j\neq k$. Incidentally, if one assumes a random coding scenario with a large processing, a similar set of results are obtained. Under these conditions, one can approximate $I_{j,l,m}^{\pm}$ as a white random sequence. That is, $$E\{(I_{j,l,m}^{\pm}(I_{j,l,n}^{\pm}))^*\} = \sigma_I^2 \delta[n-m].$$

Also considering that the number of interfering signals can be large, one can argue that $I_{j,l,m}^{\pm}$ is asymptotically Gaussian, although for some practical applications this assumption is violated. Before going any further, it is instructive to rewrite Equation (15) in terms of $$C_e^{(j,l)} = C_m^{(j,l)}(\hat{C}_m^{(j,l)})^*$$

and $$d_e^{(j)} = d_m^{(j)}(\hat{d}_m^{(j)})^*,$$

the channel estimation and symbol errors, respectively. That is, $$y_{j,l,m}^{\pm} = C_{m-1}^{(j,l)} d_{m-1}^{(j)} \left(\hat{d}_m^{(j)} \hat{C}_m^{(j,l)}\right)^* \Gamma_{j,j,m,1}^{\pm}(\tau_{j,l}, \hat{\tau}_{j,l}) + \qquad (23)$$

$$C_e^{(j,l)} d_e^{(j)} \Gamma_{j,j,m,2}^{\pm}(\tau_{j,l}, \hat{\tau}_{j,l}) \left(\hat{d}_m^{(j)} \hat{C}_m^{(j,l)}\right)^* (n_{j,l,m}^{\pm} + I_{j,l,m}^{\pm}).$$

Note that the above formulation further implies that the channel and data estimation errors are slow varying as compare to the data rate. This assumption is fairly accurate in practice, since, for most systems, the channel estimation error is a random process whose bandwidth is proportional to the bandwidth of the channel estimation tracking loop. In practice, the bandwidth of the channel estimation technique is substantially smaller than the symbol rate. Moreover, data errors occur at a rate of $10^{-3}$–$10^{-2}$, and hence data estimation error may be viewed as a slow varying process when compared to other processes whose bandwidths are comparable to the symbol rate. Finally, the tracking loop uses to generate the $y_{j,l,m}^{\pm}$ appropriate error signal. First, let us define $$\Lambda(m) = [y_{j,l,m}^+ - y_{j,l,m}^-].$$

Then, the error signal that controls the voltage controlled oscillator (VCC) (or its numerically controlled counterpart) may be expressed as (see FIG. 2)

$$ER(t, \tau_e^{(j,l)}) = F(p) \text{Re}\left\{\sum_{n=-\infty}^{\infty} \Lambda(n) P(t - nT_s)\right\} \qquad (24)$$

where p is heavyside operator, P(t) was defined earlier, Re{x} is the real part of $$x, \tau_e^{(j,l)} = \frac{\tau_{j,l} - \hat{\tau}_{j,l}}{T_c}$$

denotes the timing error for the lth path of the jth signal, F(p) is the transfer function of the loop filter, and F(p)x(t) implies a convolution operation between x(t) and the impulse response of the filter F(p). To simplify the notation, we drop the indices j and l from $\tau_e^{(j,l)}$, $C_e^{(j,l)}$, and $d_e^{(j)}$ and denote the timing error, channel estimation error, and the data error as $\tau_e$, $C_e$, and $d_e$, respectively, in the ensuing analysis. Also, without loss of generality, êj,l=0 which leads to $$\tau_e = \frac{\tau_{j,l}}{T_c}.$$

The tracking loop performance may now be characterized using Equation (24). Before doing so, one further simplification can be made by assuming that the data and channel estimation errors are replaced by their respective expected values.
That is, $$ER(t, \tau_e^{(j,l)}) = F(p) \text{Re}\left\{\sum_{n=-\infty}^{\infty} E_{C_e d_e}\{\Lambda(n)\} P(t - nT_s)\right\} \qquad (25)$$

where $E_{C_e d_e}\{\ \}$ denotes the expected value with respect to $C_e$ and $d_e$. Note that $C_e$ and $d_e$ are dependent random variables. In arriving at Equation (25), it is assumed that the bandwidths of $C_e$ and $d_e$ are smaller than the closed-loop bandwidth of the tacking device. For $C_e$, this implies that the rate at which the channel is changing is smaller than the closed-loop bandwidth of the loop. Typically, the channel condition is assumed to remain constant for many data symbols, justifying the above assumption. In the case of $d_e$, as explained hereinabove, the aforementioned assumption simply implies that data errors must remain infrequent. This assumption is readily satisfied in practice, since data error rates less than $10^{-3}$ are of interest here.

V. S-CURVE

The first measure of interest is the tracking loop S-curve, which will shed light on the tracking behavior of the loop. This parameter is obtained as follows:

$$g(\tau_e) = <E\{ER(t, \tau_e)|\tau_e\}>_t \qquad (26)$$

where $E\{x|\tau_e\}$ denotes the expectation of x conditioned on the timing error $\tau_e$ and $$<x(t)>_t = \lim_{T \to \infty} \frac{1}{T} \int_{-\frac{T}{2}}^{\frac{T}{2}} x(s) ds.$$

Considering the fact that $$E_{\tau_e}\{I_{j,l,m}^{\pm}\} = E_{\tau_e}\{n_{j,l,m}^{\pm}\} = 0,$$

and that $$E\left\{d_{m-1}^{(j)}(\hat{d}_m^{(j)}) \Big| \tau_e\right\} = 0,$$

we have $$g(\tau_e) = F(0) E\{\text{Re}\{C_e d_e\} | \tau_e\} \qquad (27)$$

$$(E\{\text{Re}\{\Gamma_{j,j,m,2}^+(T_c \tau_e, 0) - \Gamma_{j,j,m,2}^-(T_c \tau_e, 0)\} | \tau_e\}) -$$

$$F(0) E\{\text{Im}\{C_e d_e\} | \tau_e\} (E\{\text{Im}\{\Gamma_{j,j,m,2}^+(T_c \tau_e, 0) - \Gamma_{j,j,m,2}^-(T_c \tau_e, 0)\} | \tau_e\})$$

where it is assumed that $C_e$ and $d_e$ (and for that matter $\tau_e$) are relatively slow-varying as compared to the symbol rate, and hence may be factored out in computing the desired expectations. Furthermore, we have assumed that $$E\{\{\Gamma_{j,j,m,2}^+(T_c\tau_e, 0) - \Gamma_{j,j,m,2}^-(T_c\tau_e, 0)\} \mid \tau_e\}$$

is independent of m. This assumption is justified in the ensuing analysis. Moreover, Im{x} denotes the imaginary part of x. Assuming a symbol error rate of $P_{se}(\tau_e, \phi_e, a)$, it can readily be shown that $$E\{\text{Re}\{C_e d_e\} \mid \tau_e\} = \beta_r(\tau_e) \quad (28)$$

$$\approx E\left\{ a \left[ \frac{1}{2} \sum_{k=0}^{1} \cos\left(\frac{2\pi}{M}(1)^k + \phi_e\right) \right] \right.$$

$$P_{se}(\tau_e, \phi_e, a) +$$

$$(1 - P_{se}(\tau_e, \phi_e, a))\cos(\phi_e) \right] \right\}$$

$$\approx \overline{a}\left\{ \left( \cos\left(\frac{2\pi}{M}\right) - 1 \right) P_{se}(\tau_e, o, \overline{a}) + 1 \right]$$

where $$\phi_e = \arg(C_e) = \arg(C_m^{(j,l)}) - \arg(\hat{C}_m^{(j,l)}),$$
$$a = |C_e| = |\hat{C}_m^{(j,l)}| |C_m^{(j,l)}|,$$

and $\overline{a}=E\{a\}$. In arriving at the above, it is assumed that $E\{\phi_e\}=0$ (i.e., the phase estimation process yields an unbiased estimate) and that the phase and amplitude estimation error variances are negligible. That is, we have used the identity: $E\{f(x)\} \approx f(E\{x\})$. Moreover, we have assumed that, for moderate to high SNR levels, $d_e$ is a random variable that takes on a value from the set $$\left\{ e^{j\frac{2\pi}{M}}, e^{-j\frac{2\pi}{M}} \right\}$$

with an equal probability of $$a_e = \left| C_m^{(j,l)} \right| - \left| \hat{C}_m^{(j,l)} \right|.$$

and on 1 with probability $(1-P_{se})$. It is imperative to note that the above assumption is satisfied for the BPSK case for all SNR levels. For the QPSK scenario, the above assumption also yields an accurate result for moderate levels of SNR, since $d_e$ in this case takes on a value from the set $$\frac{P_{se}}{2}$$

more frequently than on any other value. Since BPSK and QPSK modulations are of interest here, we proceed with the approximation shown above. Considering the above approach, one can define amplitude estimation error as $$\left\{ 1, e^{j\frac{2\pi}{M}}, e^{-j\frac{2\pi}{M}} \right\}$$

Hence, $$\overline{a} = E\{|C_m^{(j,l)}|^2 - a_e|C_m^{(j,l)}|\} = R_c^{(j,l)}(0), \quad (29)$$

where it is assumed that $$|\hat{C}_m^{(j,l)}|$$

is an unbiased estimate of $|C_m^{(j,l)}|$, and hence $E_a\{a_e\}=0$. We also have (assuming that $\phi_e$ has a symmetrical pdf about $\phi_e=0$), $$E\{\text{Im}\{C_e d_e\} \mid \tau_e\} = \beta_I(\tau_e) \approx 0. \quad (30)$$

This leads to the following:

$$g(\tau_e) \approx F(0)\beta_r(\tau_e) E\{\text{Re}\{\Gamma_{j,j,m,2}^+(T_c\tau_e, 0) - \Gamma_{j,j,m,2}^-(T_c\tau_e, 0)\} \mid \tau_e\}. \quad (31)$$

Realizing that $$E\{\text{Re}\{\Gamma_{j,j,m,2}^+(T_c\tau_e, 0)\} \mid \tau_e\} \approx \quad (32)$$

$$E\left\{ \int_{(m-1)T_s+T_c\tau_e}^{mT_s+\frac{T_c}{2}} \text{Re}\{PN_j(t - T_c\tau_e)\} \text{Re}\left\{ PN_j^*\left(t - \frac{T_c}{2}\right) \right\} dt \mid \tau_e \right\} +$$

$$E\left\{ \int_{(m-1)T_s+T_c\tau_e}^{mT_s+\frac{T_c}{2}} \text{Im}\{PN_j(t - T_c\tau_e)\} \text{Im}\left\{ PN_j^*\left(t - \frac{T_c}{2}\right) \right\} dt \mid \tau_e \right\} \text{ and}$$

$$E\{\text{Im}\{\Gamma_{j,j,m,2}^+(T_c\tau_e, 0)\} \mid \tau_e\} \approx \quad (33)$$

$$E\left\{ \int_{(m-1)T_s+T_c\tau_e}^{mT_s+\frac{T_c}{2}} \text{Im}\{PN_j(t - T_c\tau_e)\} \text{Im}\left\{ PN_j^*\left(t - \frac{T_c}{2}\right) \right\} dt \mid \tau_e \right\} +$$

$$E\left\{ \int_{(m-1)T_s+T_c\tau_e}^{mT_s+\frac{T_c}{2}} \text{Re}\{PN_j(t - T_c\tau_e)\} \text{Im}\left\{ PN_j^*\left(t - \frac{T_c}{2}\right) \right\} dt \mid \tau_e \right\}.$$

Since for most applications, the I and Q PN codes possess identical characteristics, given by $$\int_{(m-1)T_s+T_c\tau_e}^{mT_s+\frac{T_c}{2}} \text{Re}\{PN_j(t - T_c\tau_e)\} \text{Re}\left\{ PN_j\left(t - \frac{T_c}{2}\right) \right\} dt = \quad (34)$$

$$\int_{(m-1)T_s+T_c\tau_e}^{mT_s+\frac{T_c}{2}} \text{Im}\{PN_j(t - T_c\tau_e)\} \text{Im}\left\{ PN_j\left(t - \frac{T_c}{2}\right) \right\} dt \approx$$

$$P_g T_c P_{RC}\left( \tau_e - \frac{1}{2} \right); \left| \tau_e - \frac{1}{2} \right| \leq 1,$$

we arrive at $$E\{\text{Re}\{\Gamma_{j,j,m,2}^+(T_c\tau_e, 0)\} \mid \tau_e\} \approx 2P_g T_c P_{RC}\left( \tau_e - \frac{1}{2} \right); \left| \tau_e - \frac{1}{2} \right| \leq 1, \quad (35)$$

where $P_{RC}(t) = P_c(t) \otimes P_c(t)$ is a raised-cosine (RC) pulse shape defined over an interval of 1 s. Namely, $$P_{RC}(t) = \frac{\sin(\pi t)}{\pi t} \frac{\cos(\pi \alpha t)}{1 - 4\alpha^2 t^2} \quad (36)$$

with $\alpha$ denoting the roll-off factor of the RC pulse. Moreover, assuming that the I and Q PN codes are nearly orthogonal, $$E\{\text{Im}\{\Gamma_{j,j,m,2}^+(T_c\tau_e, 0)\} \mid \tau_e\} \approx 0. \quad (37)$$

Note that $E_{\tau_e}\{\text{Re}\{\Gamma_{j,j,m,2}^+(\tau_e, 0)\}\}$ is independent of m. Similarly (see Equation (11)), $$E\{\text{Re}\{\Gamma^-_{j,j,m,2}(T_c\tau_e, 0)\} | \tau_e\} \approx 2P_gT_cP_{RC}\left(\tau_e + \frac{1}{2}\right); \left|\tau_e + \frac{1}{2}\right| \leq 1, \quad (38)$$

$$\text{and } E\{\text{Im}\{\Gamma^-_{j,j,m,2}(T_c\tau_e, 0)\} | \tau_e\} \approx 0.$$

Subsequently, the tracking loop S-curve is given by (assuming a first order loop, i.e., F(p)=1)

$$g(\tau_e) = 2\zeta P_g T_c g_n(\tau_e) \quad (40)$$

where $$g_n(\tau_e) = \frac{1}{\zeta}\beta_r(\tau_e)\left[P_{RC}\left(\tau_e - \frac{1}{2}\right) - P_{RC}\left(\tau_e + \frac{1}{2}\right)\right] \quad (41)$$

is the normalized S-curve for the tracking loop with unit slope about the origin and $$\zeta = \frac{d}{d\tau_e}\left\{\beta_r(\tau_e)\left[P_{RC}\left(\tau_e - \frac{1}{2}\right) - P_{RC}\left(\tau_e + \frac{1}{2}\right)\right]\right\}\bigg|_{\tau_e=0}. \quad (42)$$

Figure 3:
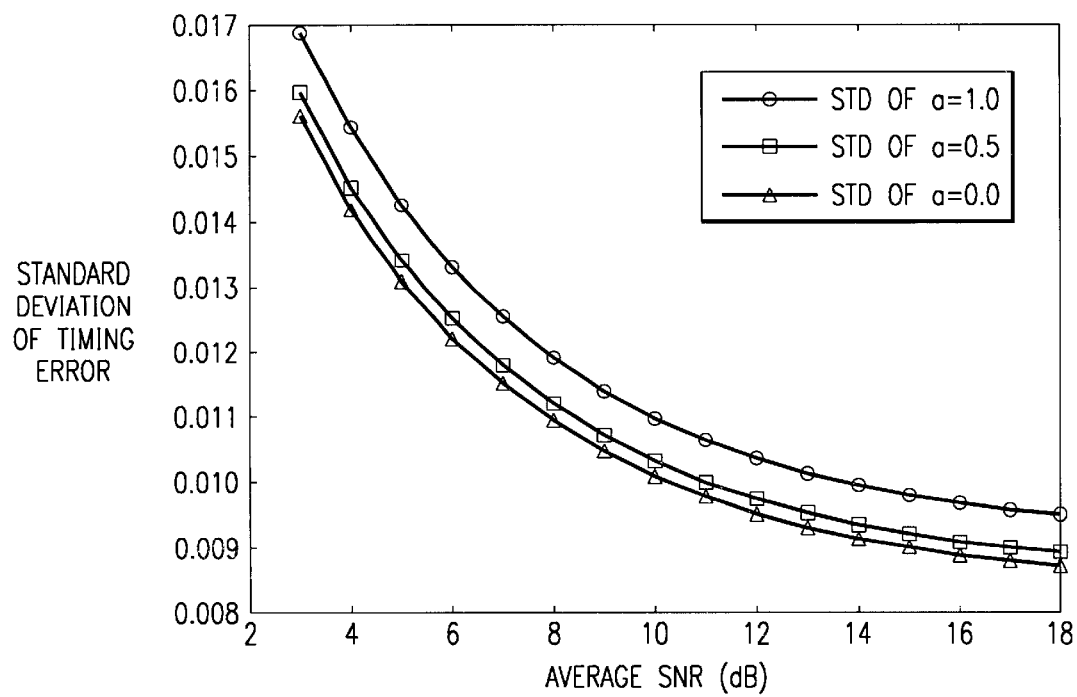

Equation (41), depicted in FIG. 3, describes the normalized S-curve of a stable tracking loop. It is important to note that the impact of imperfect estimation appears as a multiplicative term $\beta_r$. Since the peak value of the S-curve is proportional to the useful "signal" energy, the impact of imperfect estimation is to reduce the overall loop SNR and, consequently, to lower noise immunity. Moreover, we have ignored the impact of $P_{se}$ which is a function of $\tau_e$. As expected, the impact of $P_{se}$ on the S-curve is negligible when the loop is operating in the vicinity of $\tau_e=0$. Before leaving this section, let us define the equivalent loop noise, given by $$n_e(t, \tau_e) = \sum_{n=-\infty}^{\infty} n_e(m, \tau_e)P(t - mT_s) = ER(t, \tau_e) - g(\tau_e) \quad (43)$$

where $n_e(m_e, \tau_e)$ may be defined in terms of $\Lambda(m)$ (see Equation (24)). The remaining task is to characterize $n_e(t, \tau_e)$.

VI. STEADY STATE PERFORMANCE OF A FIRST ORDER CADD-DLL

A. Mean-Square Timing Error-Linear Model

In this section, we first characterize $n_e(m_e, \tau_e)$ and then proceed to obtain the variance of the normalized timing error for a linearized tracking loop in its steady state mode. First, it is rather obvious that $n_e(m_e, \tau_e)$ is a zero mean random sequence. To obtain the second order statistics of $n_e(m_e, \tau_e)$ we need to resort to approximation. First, note that $$\Gamma^\pm_{j,j,m,1}(T_c\tau_e, 0) << \Gamma^\pm_{j,j,m,2}(T_c\tau_e, 0)$$

when $$|\tau_e| < \frac{1}{2}.$$

In fact, $$\frac{\Gamma^\pm_{j,j,m,1}(T_c\tau_e, 0)}{\Gamma^\pm_{j,j,m,2}(T_c\tau_e, 0)}$$

is proportional to $$\frac{1}{P_g} << 1.$$

Since we are interested in the performance of the loop in its linear range (i.e. when $$|\tau_e| < \frac{1}{2},$$

one can ignorer $$\Gamma^\pm_{j,j,m,1}(T_c\tau_e, 0)$$

in Equation (15), which leads to the above assumption. Given the above assumptions, $$\Lambda(m) \approx E_{C_e,d_e}\{C_e d_e\}[\Gamma^+_{j,j,m,2}(T_c\tau_e, 0) - \Gamma^-_{j,j,m,2}(T_c\tau_e, 0)] + \quad (44)$$
$$\left(\hat{d}^{(j)}_m \hat{C}^{(j,l)}_m\right)^*[n^+_{j,l,m} - n^-_{j,l,m} + I^+_{j,l,m} - I^-_{j,l,m}].$$

If we assume a first order loop, and substituting for $\Lambda(m)$ in Equation (24), Equation (43) yields $$n_e(m, \tau_e) = \text{Re}\{E_{C_e,d_e}\{C_e d_e\}[\Gamma^+_{j,j,m,2}(T_c\tau_e, 0) - \quad (45)$$
$$\Gamma^-_{j,j,m,2}(T_c\tau_e, 0)]\} - g(\tau_e) +$$
$$\text{Re}\{\hat{d}^{(j)}_m \hat{C}^{(j,l)}_m\}[\text{Re}\{n^+_{j,l,m}\} - \text{Re}\{n^-_{j,l,m}\} +$$
$$\text{Re}\{I^+_{j,l,m}\} - \text{Re}\{I^-_{j,l,m}\}] +$$
$$\text{Im}\{\hat{d}^{(j)}_m \hat{C}^{(j,l)}_m\}[\text{Im}\{n^+_{j,l,m}\} - \text{Im}\{n^-_{j,l,m}\} +$$
$$\text{Im}\{I^+_{j,l,m}\} - \text{Im}\{I^-_{j,l,m}\}].$$

To simplify the notation and considering that the statistics of $n_{j,l,m}{}^+$ and $n_{j,l,m}{}^-$ are independent of j and l, we define $$s(m, \tau_e) = \beta_r(\tau_e)\text{Re}\{[\Gamma^+_{j,j,m,2}(T_c\tau_e, 0) - \Gamma^-_{j,j,m,2}(T_c\tau_e, 0)]\} - \quad (46)$$
$$\beta_r(\tau_e)\text{Im}\{[\Gamma^+_{j,j,m,2}(T_c\tau_e, 0) - \Gamma^-_{j,j,m,2}(T_c\tau_e, 0)]\} -$$
$$g(\tau_e),$$

$$n(m) = \text{Re}\{\hat{d}^{(j)}_m \hat{C}^{(j,l)}_m\}[\text{Re}\{n^+_{j,l,m}\} - \text{Re}\{n^-_{j,l,m}\}] + \quad (47)$$
$$\text{Im}\{\hat{d}^{(j)}_m \hat{C}^{(j,l)}_m\}[\text{Im}\{n^+_{j,l,m}\} - \text{Im}\{n^-_{j,l,m}\}],$$

and $$I(m) = \text{Re}\{\hat{d}^{(j)}_m \hat{C}^{(j,l)}_m\}[\text{Re}\{I^+_{j,l,m}\} - \text{Re}\{I^-_{j,l,m}\}] + \quad (48)$$
$$\text{Im}\{\hat{d}^{(j)}_m \hat{C}^{(j,l)}_m\}[\text{Im}\{n^+_{j,l,m}\} - \text{Im}\{n^-_{j,l,m}\}].$$

This leads to $$n_e(m,\tau_e) = s(m,\tau_e) + n(m) + I(m). \quad (49)$$

In Appendix A, it is shown that n(m) and I(m) are zero mean, independent random sequences whose auto-correlation functions satisfy:

$$E\{n(q)n(p)\}=4N_0T_s(R_c^{(j,l)}(0)+\sigma_{a_e}^2)\delta[q-p] \quad (50)$$

and $$E\{I(m)I(n)\}=2\sigma_I^2(R_c^{(j,l)}(0)+\sigma_{a_e}^2)\delta[n-m] \quad (51)$$

In the above equation, $$\sigma_{a_e}^2 = E_a\{a_e^2\}$$

denotes the variance of the amplitude estimation error. Hence, the two random sequences n(m) and I(m) may be regarded as a pair of independent white random sequences. We also need to characterize $s(m, \tau_e)$. Obviously, $$E\{s(m,\tau_e)|\tau_e\}\approx 0 \quad (52)$$

(see Equation (31) and note that $n_e(m, \tau_e)$ is a zero mean random sequence). Moreover, it is shown in Appendix B that $$E\{s(m,\tau_e)s(n,\tau_e)|\tau_e\}\approx 0. \quad (53)$$

It is interesting to note that $s(m, \tau_e)$ does not enter the computation for the variance of timing error. This is expected, since a CADD-DLL is not impaired by self-noise. However, the impact of channel estimation error is present through $\beta_r(\tau_e)$ and $\sigma_{a_e}^2$. In light of the above observations, the power spectrum level of $n_e(t, \tau_e)$ is only needed to fully characterize the steady state behavior of the loop. To that end, let $$R_{n_e}(t_1,t_2)=E\{n_e(t_1,\tau_e)n_e(t_2,\tau_e)|\tau_e\} \quad (54)$$

denote the auto-correlation function of the equivalent noise. Then, the two-sided power spectrum level may be obtained as [see John G. Proakis. Digital Communications. McGraw-Hill, New York, $3^{rd}$ edition, 1989 (hereinafter referred to as "Proakis"), pp 204–207], $$\frac{N_{eq}(\tau_e)}{2} = < \int_{-\infty}^{\infty} R_{n_e}(t_1, t_2) dt_1 > t_2 \quad (55)$$

$$= E\{n_e(m, \tau_e)^2\}|P(f)|^2\Big|_{f=0} \frac{}{T_s}$$

$$= T_s E\{n_e(m, \tau_e)^2\}$$

where $P(f)=T_s \sin c(\pi f T_s)$ is the Fourier transform of P(t). Note that the power spectrum level of the equivalent noise is dependent upon the residual timing error. Hence, one may use the average power spectrum level (obviously, one requires the pdf of $\tau_e$ to acquire the necessary expectation but, in the absence of such a pdf, one can assume a uniformly distributed timing error, which leads to a worst case scenario analysis), given by $$N_{avg} = \int_{\tau_e=-\frac{1}{2}}^{\frac{1}{2}} N_{eq}(\tau_e) d\tau_e \quad (56)$$

Then, $$N_{avg}=2T_s(4N_0T_s+2\sigma_I^2)(R_c^{(j,l)}(0)+\sigma_{a_e}^2). \quad (57)$$

The variance of timing error may now be defined as (see Simon, et al., page 161)

$$\sigma_{\tau_e}^2 = \frac{N_{avg}B_L}{(2\zeta P_g T_c)^2} = \frac{N_{avg}B_L}{\rho_s^2} \quad (58)$$

with $B_L$ denoting the one-sided equivalent noise bandwidth of the tracking loop and $\rho_s=2\zeta P_g T_c$. To complete the analysis, we need to evaluate $\sigma_I^2$ (see Equation (51)). In Appendix C, we have derived an expression for the worst case $\sigma_I^2$, which is given by $$\sigma_{I\pm}^2 = \sigma_I^2 \leq \frac{4\eta P_{max}T_s^2 \nu}{P_g}(N_u s_{max} - 1) \quad (59)$$

with $P_{max}$ and $s_{max}$ denoting the maximum received power from any path and the maximum number of multipath for any given signal, respectively. Moreover, $\nu$ is a constant that is defined in Appendix C. Then, we arrive at an upper bound on $\sigma_{\tau_e}^2$, given by $$\sigma_{\tau_e}^2 \leq 2B_L T_s \left[\frac{N_0}{\zeta^2 T_s} + \frac{2\nu\eta P_{max}}{P_g \zeta^2}(N_u s_{max} - 1)\right](\bar{a} + \sigma_{a_e}^2). \quad (60)$$

As expected, the first term inside the parentheses corresponds to the additive noise and is independent of the processing gain and is merely a function of the signal-to-noise ratio. The second term, which is due to interference, is a function of the processing gain and the total number of interferers. Finally, due to channel estimation errors, a multiplicative term appears in Equation (60), which is a function of the amplitude estimation error and the variance of channel MD. This expression will be numerically evaluated in the next section. It is, however, important to note that $\zeta$ is also a function of $\bar{a}$ (see Equation (42) and Equation (28)), and hence the relationship between timing error variance and $\bar{a}$ is not a linear one, as predicted by Equation (60). Also, since the symbol error rate in the vicinity of $\tau_e=0$ is a weak function of $\tau_e$, we can simplify Equation (60) further. That is, $$\beta_r(\tau_e) = \beta_r \approx \bar{a}\left[\left(\cos\left(\frac{2\pi}{M}\right)-1\right)P_{se}(0,0,\bar{a})+1\right] \quad (61)$$

which leads to $$\zeta = \beta_r \frac{d}{d\tau_e}\left[P_{RC}\left(\tau_e-\frac{1}{2}\right)-P_{RC}\left(\tau_e+\frac{1}{2}\right)\right]\Big|_{\tau_e=0} \quad (62)$$

$$= 2\beta_r\left[\frac{2\alpha\sin\left(\frac{\pi\alpha}{2}\right)}{1-\alpha^2} + \frac{4\cos\left(\frac{\pi\alpha}{2}\right)(1-3\alpha^2)}{\pi(1-\alpha^2)^2}\right].$$

We also have $$g_n(\tau_e) = \frac{1}{2}\left[\frac{2\alpha\sin\left(\frac{\pi\alpha}{2}\right)}{1-\alpha^2} + \frac{4\cos\left(\frac{\pi\alpha}{2}\right)(1-3\alpha^2)}{\pi(1-\alpha^2)^2}\right]^{-1} \quad (63)$$

$$\left[P_{RC}\left(\tau_e-\frac{1}{2}\right)-P_{RC}\left(\tau_e+\frac{1}{2}\right)\right]$$

and (see Proakis, page 786)

$$P_{se}(0, 0, \bar{a}) = \frac{(-1)^{s_{max}-1}(1-\mu^2)^{s_{max}}}{\pi(s_{max}-1)!} \left( \frac{\partial^{s_{max}-1}}{\partial b^{s_{max}-1}} \left\{ \frac{1}{b-\mu^2} \left[ \frac{\pi}{M}(M-1) - \left( \frac{\mu\sin\left(\frac{\pi}{M}\right)}{\sqrt{b-\mu^2\cos^2\left(\frac{\pi}{M}\right)}} \cot^{-1} \frac{\mu\cos\left(\frac{\pi}{M}\right)}{\sqrt{b-\mu^2\cos^2\left(\frac{\pi}{M}\right)}} \right) \right] \right\} \right)_{b=1} \quad (64)$$

where $\mu$ $$\mu = \sqrt{\frac{\bar{\gamma}_c}{1+\bar{\gamma}_c}} \text{ with } \bar{\gamma}_c = \frac{\bar{a}T_s}{N_0}$$

denoting the average received SNR for each path of the multipath channel. In arriving at Equation (64), it is assumed that the receiver performs a maximal ratio combining (MRC) operation over $s_{max}$ distinct paths ($s_{max}$-finger RAKE reception) and that no forward error correction coding is applied. Furthermore, it is assumed that the average received SNR for all the multi-path channels are identical. Since the inclusion of a forward-error correction mechanism in general reduces the overall symbol error rate, we proceed to use Equation (64) as an upper bound on the symbol error rate. It is important to note that, the two special cases of interest here are the binary PSK and QPSK modulation schemes, which implies that a coherent NIRC is required. For the two cases of interest and assuming equal energy in multipath channels, we have (see Proakis, pages 781 and 786)

$$P_{se}(0, 0, \bar{a}) = \left( \frac{1}{4\bar{\gamma}_c} \right)^{s_{max}} \binom{2s_{max}-1}{s_{max}}, \text{ for } BPSK, \quad (65)$$

and $$P_{se}(0, 0, \bar{a}) \approx 1 - \frac{\mu}{\sqrt{2-\mu^2}} \sum_{k=0}^{s_{max}-1} \binom{2k}{k} \left( \frac{1-\mu^2}{4-2\mu^2} \right)^k, \text{ for } QPSK, \quad (66)$$

where for BPSK $P_{se}(0,0,\bar{a})$ denotes the bit error rate, whereas $P_{se}(0,0,\bar{a})$ is the symbol error rate for the QPSK scenario. In arriving at Equation (66), we have a assumed that $P_{se}(0,0,\bar{a}) \approx 2P_b(0,0,\bar{a})$ (Grey encoded), where $P_b(0,0,\bar{a})$ denotes the bit error rate for the QPSK scenario, given in Proakis, page 786. Hence, we arrive at an upper bound on $\sigma_{\tau_e}^2$, given by $$\sigma_{\tau_e}^2 \leq 2B_L T_s \left[ \frac{1}{\bar{\gamma}_c \delta^2} + \frac{2vP_{max}}{P_g \delta^2 P_{avg}} (N_u s_{max} - 1) \right] \left( 1 + \frac{\sigma_{a_e}^2}{\bar{a}} \right) \quad (67)$$

where $$\delta = \quad (68)$$

$$2\left[ \left( \cos\left(\frac{2\pi}{M}\right) - 1 \right) P_{se}(0, 0, \bar{a}) + 1 \right] \left[ \frac{2\alpha\sin\left(\frac{\pi\alpha}{2}\right)}{1-\alpha^2} + \frac{4\cos\left(\frac{\pi\alpha}{2}\right)(1-3\alpha^2)}{\pi(1-\alpha^2)^2} \right],$$

$$P_{avg} = \frac{\bar{a}}{\eta}. \quad (69)$$

$P_{avg}$ denotes the average power from the desired path in the absence of log-normal shadowing. As noted earlier, the actual symbol error rate is smaller than what is predicted here, since in practice FEC is employed. Note that an upper bound on the symbol error rate leads to a lower bound on $\delta$. In turn, a lower bound on $\delta$ leads to an upper bound on $\sigma_{\tau_e}^2$, as shown hereinabove.

This is not a surprising result since the multipath component as well as the desired path signal component experience the same channel effects in terms of log-normal shadowing, and a ratio of the average received power from the desired signal path to that of an interfering path is independent of the log-normal shadowing coefficient $\eta$. Since power control is employed in commercial CDMA systems, one can view $$10\log_{10}\left(\frac{P_{max}}{P_{avg}}\right)$$

as the peak power control error in dB. Hence, $$\sigma_{\tau_e}^2 \leq 2B_L T_s \left[ \frac{1}{\bar{\gamma}_c \delta^2} + \frac{2v}{P_g \delta^2} (N_u s_{max} - 1) 10^{\frac{P_{mpe}}{10}} \right] \left( 1 + \frac{\sigma_{a_e}^2}{\bar{a}} \right) \quad (70)$$

where $P_{mpc}$ denotes the maximum power control error in dB. Note that $P_{mpc}$ may play a positive role here. That is, if $P_{mpc}$ is negative, this implies that the power control error has caused a stronger desired signal as compared to the interfering signals. For a positive $P_{mpc}$, nonetheless, a degradation in performance is always resulted. Finally, we note that the one-sided loop bandwidth $B_L$ for a first order loop is given by $$B_L = \frac{\rho_s K_L}{4}$$

where $K_L$ is the gain of the loop. Hence, $B_L$ is a function of $\zeta$, and hence is dependent on $\bar{a}$ and $P_{se}(0,0,\bar{a})$. In the ensuing analysis, we consider the case where, for a given a and $P_{se}(0,0,\bar{a})$, $K_L$ is appropriately selected so that a desired $B_L$ is achieved. Equation (70) sheds light on the impact of various parameters on the performance of the loop. In particular, the last term in the parentheses is no longer a linear function of $\bar{a}$. Instead, and quite appropriately, it is a function of the normalized amplitude estimation error. Moreover, the impact of imperfect data estimation appears as a multiplicative term in the denominator of the two terms in the first set of parentheses, underscoring the fact that the impact of data errors is to reduce the amount of useful energy that is available for time tracking. If the user-induced interference is ignored, then Equation (70) reduces to an expression that is identical to the variance of timing error for a non-coherent DLL with a squaring loss (see Simon, et al., page 161) of $$10\log\left[\frac{\delta^2}{\left(4\left(1+\frac{\sigma_{a_e}^2}{\bar{a}}\right)\right)}\right] \text{ dB.}$$

In the context of an NC-DLL, the squaring loss is defined as the ratio of the strength of the signal×signal term to that of the sum of signal×noise and noise×noise terms. Therefore, if one is to compare the performance of the proposed DLL and that of a conventional NC-DLL, $$10\log\left[\frac{\delta^2}{\left(4\left(1+\frac{\sigma_{a_e}^2}{a}\right)\right)}\right] dB$$

must be compared to the a squaring loss of a NC-DLL, although the presence of user-induced interference in a NC-DLL results in an interference level due to the squaring operation that is higher than that shown in Equation (70). We then define $\partial_L$ as the equivalent "squaring" loss factor for the proposed loop when user-induced interference is small. $\partial_L$ is given by $$\partial_L = 10\log\left\{\frac{\left(\left[\left(\cos\left(\frac{2\pi}{M}\right)-1\right)P_{se}(0,0,\overline{a})+1\right]\right)^2}{\left[\frac{2\alpha\sin\left(\frac{\pi\alpha}{2}\right)}{1-\alpha^2}+\frac{4\cos\left(\frac{\pi\alpha}{2}\right)(1-3\alpha^2)}{\pi(1-\alpha^2)^2}\right]^2}{\left(1+\frac{\sigma_{a_e}^2}{a}\right)}\right\}. \tag{71}$$

B. Mean-Time-To-Loss (MTTL)

To carry out the necessary analysis, one needs to obtain an integro-differential equation that describes the dynamics of the tracking loop. This equation, for our model here, is given by $$\frac{d\tau_e}{dt} = K_v ER(m,\tau_e) = K_v F(p)[g(\tau_e) + n_e(t,\tau_e)] \tag{72}$$

where $K_v$ is the gain of the VCC. Equation (72) may be described in terms of the normalized S-curve as $$\frac{d\tau_e}{dt} = \rho_s K_v F(p)\left[g(\tau_e) + \frac{n_e(t,\tau_e)}{\rho_s}\right], \tag{73}$$

where $\rho_s$ was defined previously. The problem of MTTL for a tracking loop impaired by noise can be viewed as a special case of the general problem of finding the $n^{th}$ moment of the first passage time of the error process in synchronous control systems. In general, tractable results may be obtained if one assumes that the noise (which includes the multi-user interference) that derives the system is wideband as compared to the system bandwidth (see Simon, et al., pp. 183–185). This assumption can be satisfied here since the two components of noise here, i.e., the additive Gaussian noise and the interference noise (which remains at a bandwidth much greater than the symbol rate after de-spreading), are wideband as compared to the bandwidth of the de-spread signal. As shown in Lindsey [William C. Lindsey. Synchronization Systems in Communication and Control. Information and System Sciences. Prentice-Hall, Inc., 1976 (hereinafter referred to as "Lindsey")], pp. 407–410, when a first order synchronous system is considered, the first moment of the first passage time of the error process is given by $$T = \frac{1}{K_2}\int_0^b\int_0^b \exp[U(y)-U(x)]dydx \tag{74}$$

where ±b is the symmetrical boundaries of the synchronous control system, $K_2$ is the second order intensity coefficient of the Fokker-Planck equation governing the dynamics of the loop, and U(x) is given by $$U(x) = -\int^x h(s)ds \tag{75}$$

with h(x) denoting the symmetrical restoring force. Also, h(x) is given by (see Lindsey, page 387 and pp.407–410)

$$h(x) = \frac{2K_1}{K_2} = \frac{1}{\sigma_{\tau_e}^2}g_n(x)$$

where $K_1$ is the first order intensity coefficient of the Fokker-Planck equation. Also, for the S-curve described above, b=3/2. To complete the analysis, one requires $K_2$, which is given by Lindsey, page 386, $$K_2 = \frac{K_v^2 N_{avg}}{2} = 8B_L\sigma_{\tau_e}^2. \tag{76}$$

In arriving at Equation (76), we have used Equation (58) and the identity (see Lindsey, page 136)

$$B_L = \frac{K_v\rho_s}{4}$$

(note that unity gain mixers are considered here, resulting in a $K_L$ that is identical to $K_v$). Hence, $$B_L\overline{T} = \frac{1}{8\sigma_{\tau_e}^2}\int_0^{\frac{3}{2}}\int_0^{\frac{3}{2}}\exp[U(y)-U(x)]dydx. \tag{77}$$

This expression agrees with the one in Simon, et al., page 184. The remaining task is to evaluate U(x) and substitute the final expression in (77). In view of Equation (41), U(x) is evaluated via numerical integration in the next section.

VII. NUMERICAL RESULTS

Figure 4:
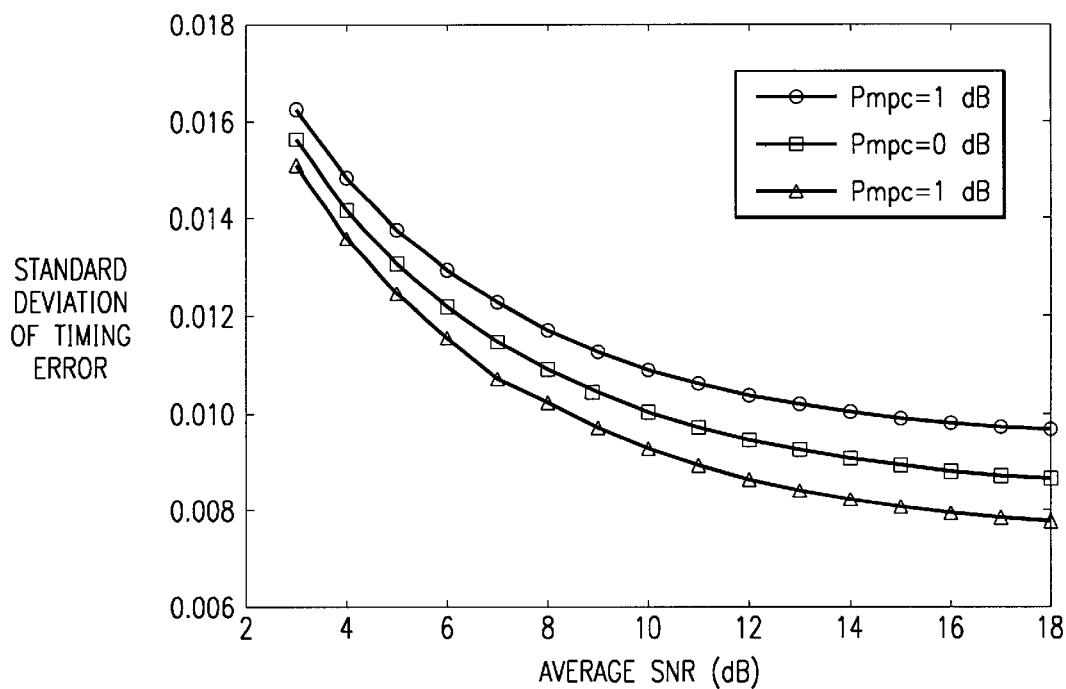
Figure 5:
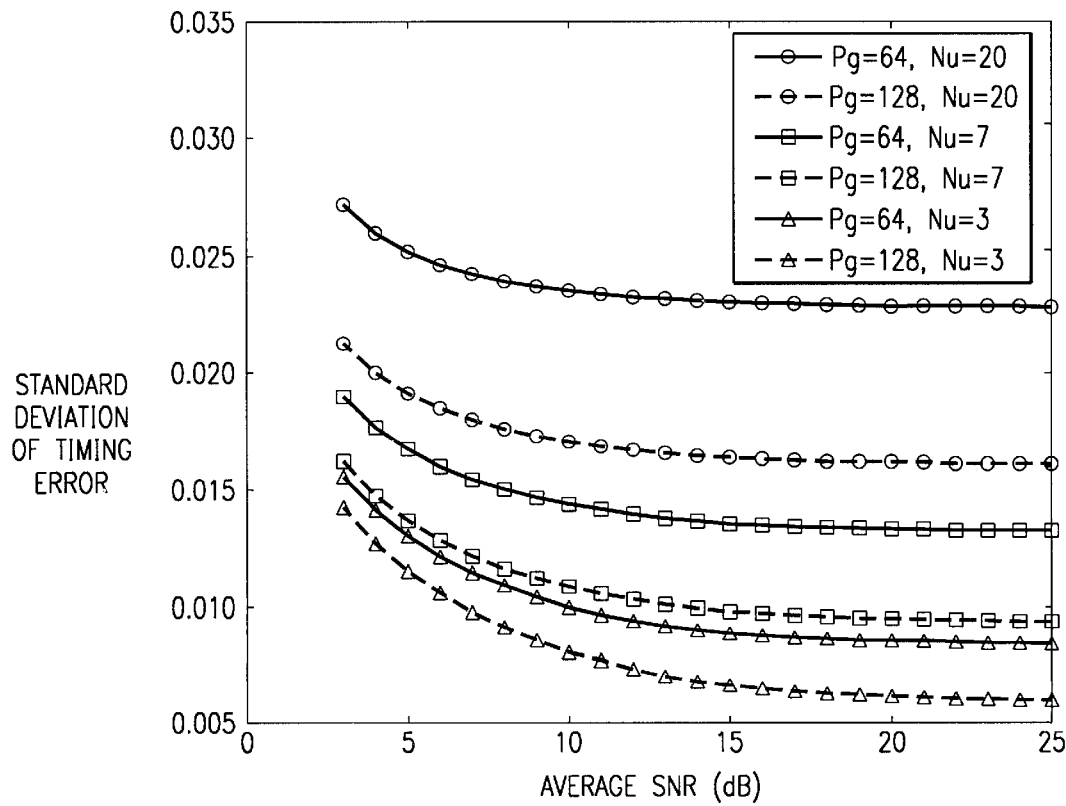
Figure 6:
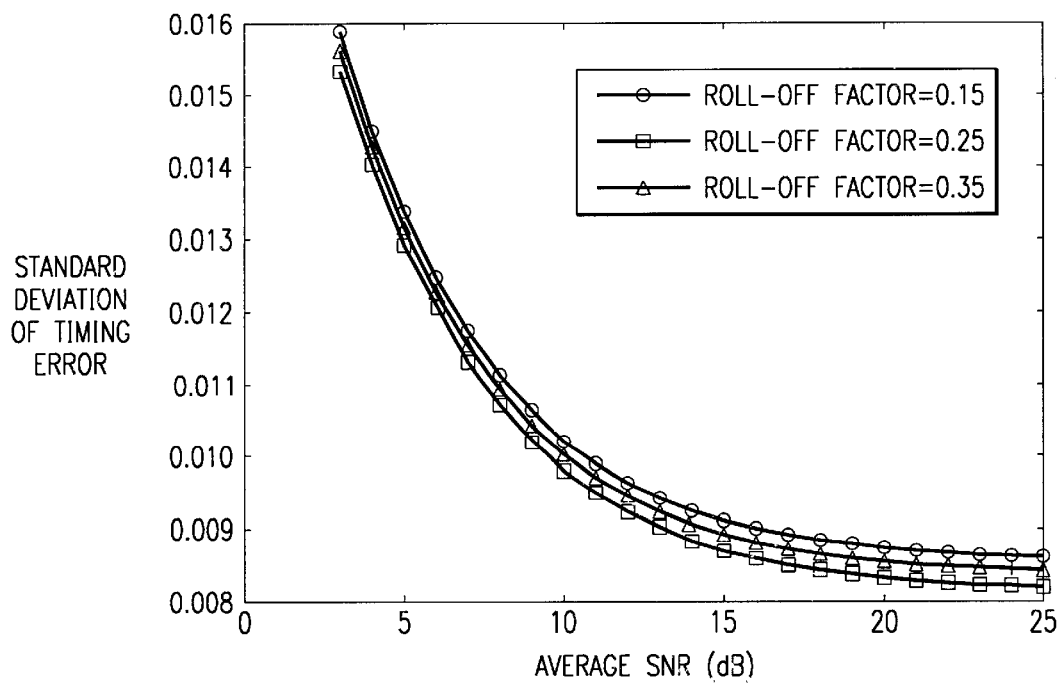
Figure 7:
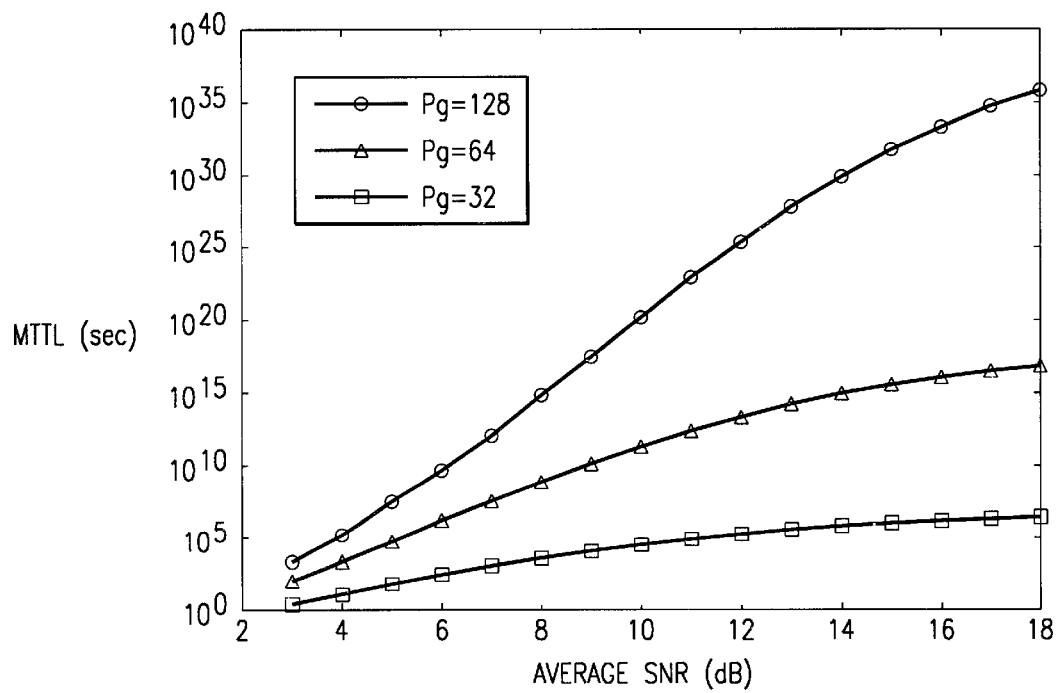
FIGS. 7–11 show graphs illustrating mean-time-to-loss for the tracking loop of the channel-aided decision-directed delay-locked loop in accordance with the present invention under various conditions.

In this section, we present a numerical analysis of the results presented in previous sections. In particular, we are concerned with the variance of timing error and MTTL when a number of impairments are present. Without loss of generality, we consider a BPSK modulation for the remainder of this section. In FIG. 2, $\sigma_{\tau_e}$ is plotted versus the average SNR in dB for various processing gain levels when there are three (3) interfering users present. As expected, an increase in the processing gain has a significant impact on $\sigma_{\tau_e}$ for large SNR levels. Note that a floor is formed at 18 dB of SNR and that a reduction in this floor is significant for a large $P_g$. This may be explained by noting that at low SNR levels the timing error is dominated by the additive noise and not by user-induced interference, and hence an increase in the processing gain has a limited impact on improving performance. This situation reverses when large SNR levels are considered. The impact of imperfect amplitude estimation error on $\sigma_{\tau_e}$ is examined in FIG. 3. From this figure, it becomes obvious that imperfect amplitude estimation has only a limited impact on $\sigma_{\tau_e}$ and that a reasonable performance can be expected in the presence of a moderate amplitude estimation error. In FIG. 4, the impact of $P_{mpc}$ on $\sigma_{\tau_e}$ is investigated. Unlike the previous case, at high SNR, the impact of $P_{mpc}$ is non-negligible. Since this parameter is directly impacted by the processing gain, one can compensate for the presence of a positive $P_{mpc}$ (in dB) by increasing $P_g$. In FIG. 5, we have depicted the impact of user-induced interference for various processing gain levels. As can be seen, an increase in the number of interfering users has a profound impact on the performance of the tracking loop. For instance, at 15 dB of average SNR, $\sigma_{\tau_e}$ is more than doubled when $N_u$ is increased from 3 to 20 dB for a processing gain of 64 dB. Furthermore, from this figure, one can conclude that an increase in the processing gain is an effective means of undermining the impact of user induced interference. The degree by which such an interference can be mitigated increases with the number of active interferers. Namely, a significant improvement in performance can be expected due to an increase in $P_g$ when $N_u$ is large (case of interest). Finally, in FIG. 6, we have depicted $\sigma_{\tau_e}$, for various RC roll-off factor. It is quite obvious that a large variation in the roll-off factor has only a minor impact on the performance of the tracking loop.

Figure 8:
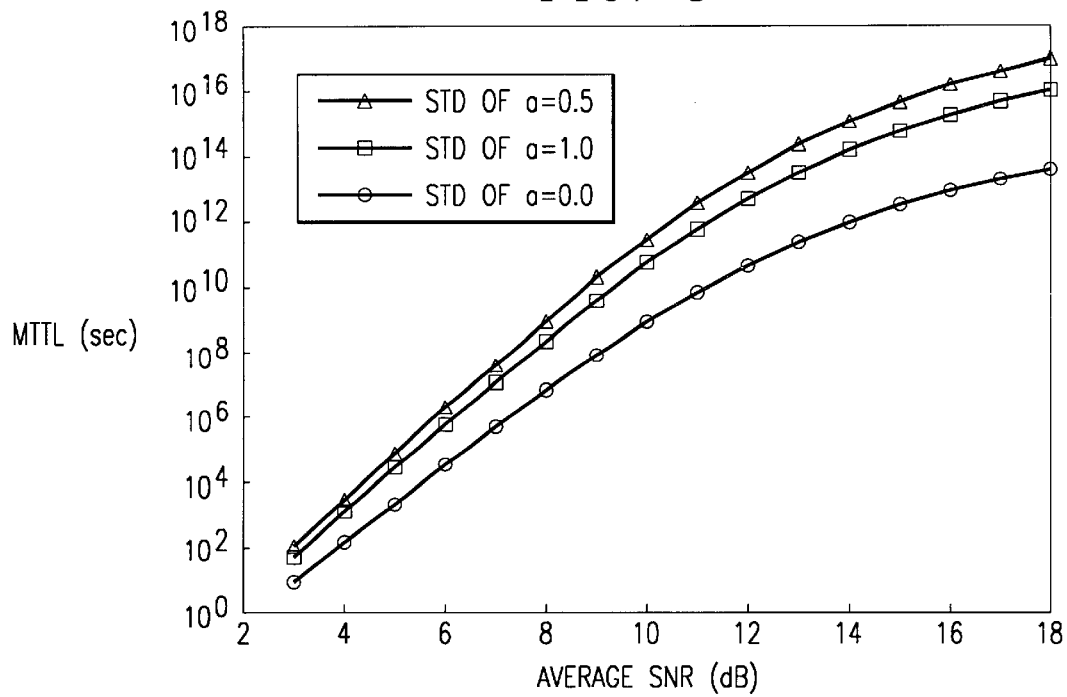
Figure 9:
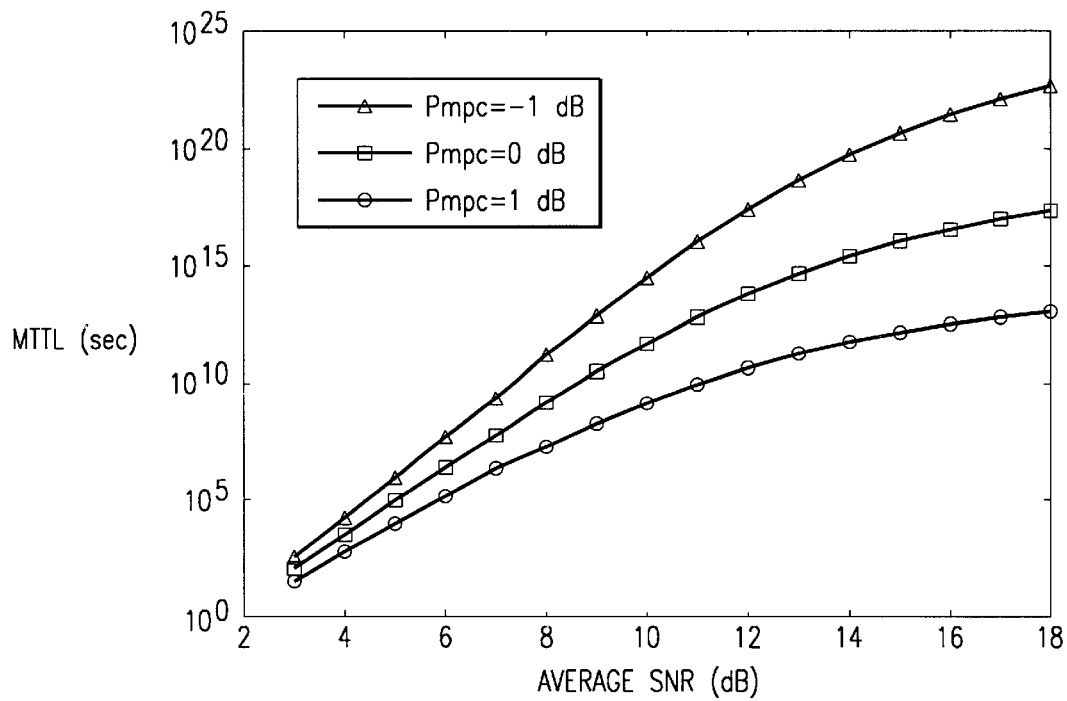

In FIGS. 7–11, we have depicted the MTTL for the proposed DLL under various channel and system conditions. We have also reduced $B_L T_s$ from $10^{-3}$ in FIGS. 2–6 to $10^{-1}$ to evaluate the performance of the loop under a non-ideal condition. First, in FIG. 7, the MTTL (in seconds) is depicted versus the average SNR for various processing gain levels. It is interesting to note that an unacceptable performance is resulted for a processing gain level less than 64 dB. Moreover, a processing gain of 128 dB results in an MTTL that is substantially greater than that for the $P_g$=32 case. Interestingly, for SNR levels less than 5 dB, a poor performance in terms of MTTL can be expected for $P_g$ ranging from 128 dB to 32 dB. In FIG. 8, we have depicted the MTTL for various amplitude estimation error levels. Similar to the case for $\sigma_{\tau_e}$ the MTTL is a weak function of the amplitude estimation error, reinforcing our earlier observation regarding this parameter. In FIG. 9, we have depicted the MTTL for various levels of $P_{mpc}$. From this figure, we can conclude that the impact of $P_{mpc}$ is only significant for high average SNR levels (i.e., >10 dB). For instance, for an SNR level of 18 dB, the MTTL decreases from $10^{23}$ seconds to $10^{13}$ seconds when $P_{mpc}$ is increased from −1 dB to 1 dB. Although this is a dramatic decrease in the loop MTTL, an MTTL of $10^{13}$ seconds is long enough for any application of interest, and hence one can ignore the impact of $P_{mpc}$ on the MTTL at high SNR levels. However, at medium to low SNR levels, a different situation is encountered. To elaborate, at an average SNR level of 4 dB, an increase from −1 dB to 1 dB in $P_{mpc}$ results in a reduction from $10^4$ seconds to $10^4$ seconds in the MTTL. Although the reduction in MTTL is not as dramatic as the one for the high-SNR-level scenario, an MTTL of $10^2$ seconds is unacceptable for most practical applications. Hence, one must insure a small $P_{mpc}$ (or a negative $P_{mpc}$ in dB) for a proper operation at medium to low SNR scenarios.

Figure 10:
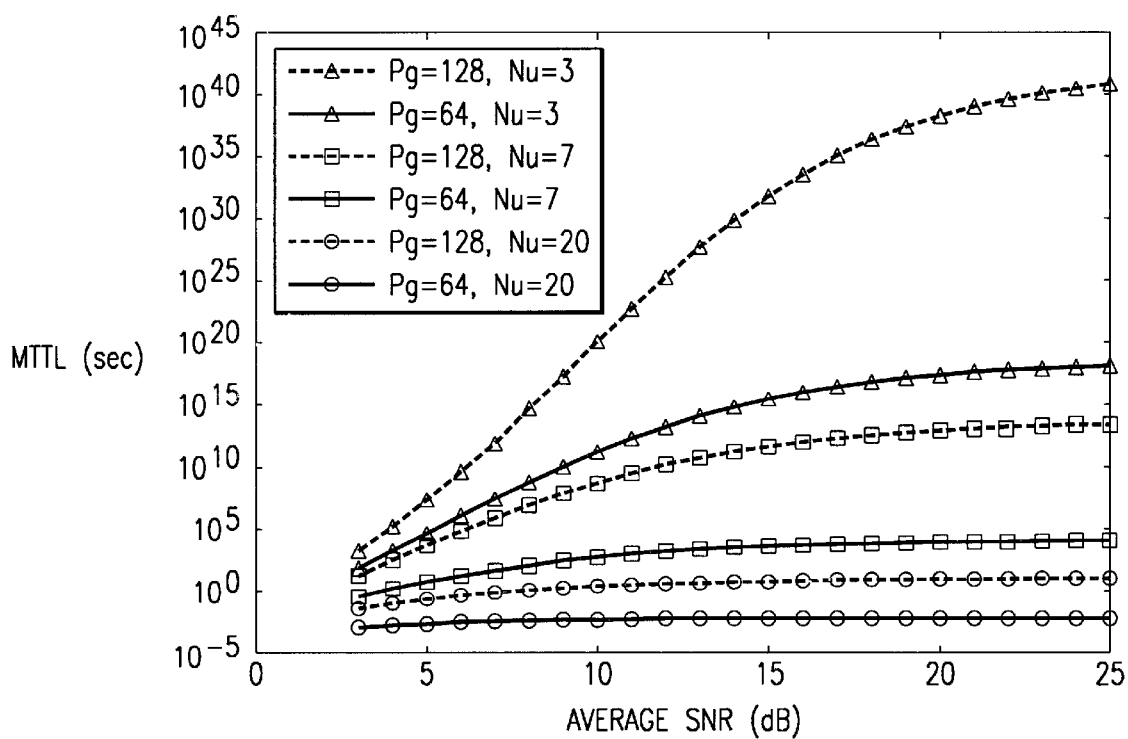
Figure 11:
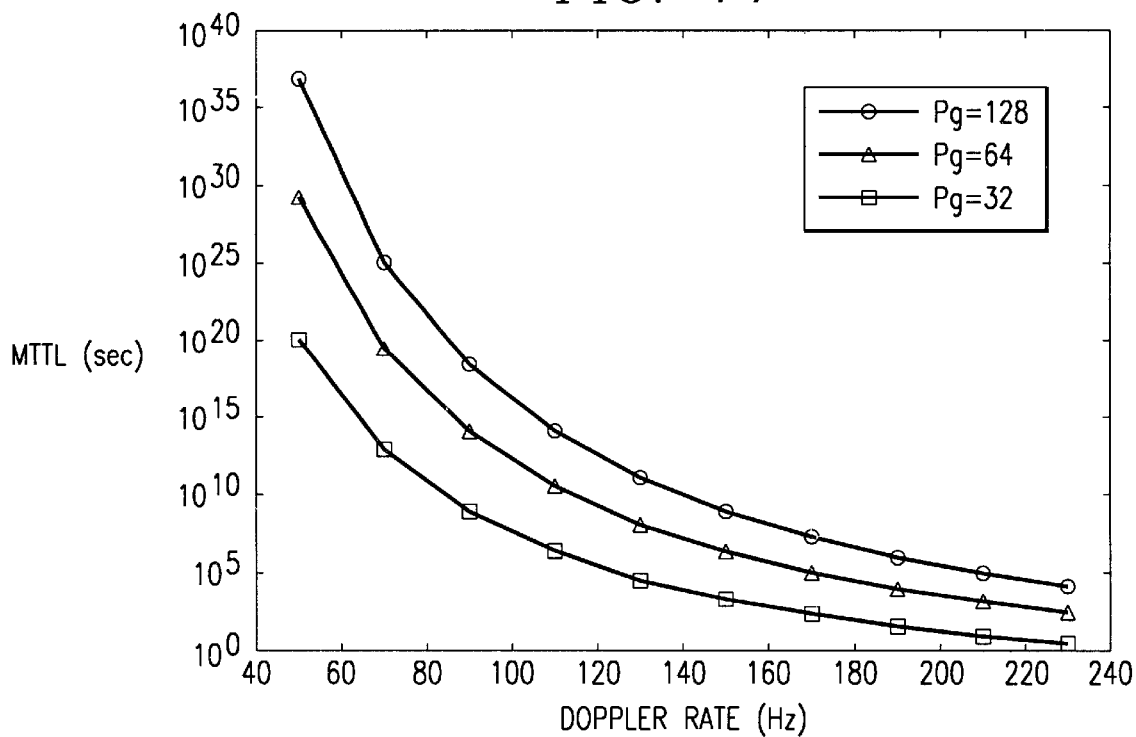

The MTTL for various levels of user-induced interference is depicted in FIG. 10. As observed above, the impact of the user-induced interference is quite dramatic on the performance of the loop. For instance, for a SNR of 15 dB and when $P_g$=64, the MTTL reduces from $10^{16}$ seconds to $10^{-2}$ seconds when the number of interfering users increases from 3 to 20. Similar to the previous case, an increase in the processing gain is one effective remedy for this problem. For example, an increase in the processing gain from 64 dB to 128 dB increases the MTTL from an unacceptable 10 seconds range to a more reasonable $10^4$ seconds range for an average SNR of 5 dB when 7 interfering users are present.

Finally, we have depicted the MTTL as a function of the Doppler rate. $B_L$ is changed in accordance to the Doppler rate to insure a sufficient dynamic range for the loop. More specifically, a $B_L$ that is 100 times the Doppler rate is considered to provide a sufficient tracking range in the face of a time-varying channel. Note that the Doppler rate of a mobile can be used to determine the mobile units speed with respect to a base station. Hence, the Doppler rate can be used to determine the range rate as well. Since the CADD-DLL is a delay tracking loop, it must be able to track the range rate encountered in the channel. This, in turn, requires a loop bandwidth for the CADD-DLL that must remain greater than the range rate of the mobile unit. Also, we have insured that, for the maximum Doppler rate considered, $B_L T_s$ remains small to guarantee a small $\sigma_{\tau_e}$. It is quite clear that an increase in the Doppler shift has a significant impact on the performance of the loop in terms of the MTTL. Interestingly enough, at a low Doppler rate, the processing gain has a noticeable impact on the MTTL. As one increases the Doppler rate, the improvement in the MTTL due to an increase in the processing gain becomes less noticeable. Nonetheless, the processing gain plays a key role here. For instance, for a Doppler rate of 200 Hz, the MTTL increases from an unacceptable level of 10 seconds to $10^5$ seconds when the processing gain is increased from 32 dB to 128 dB. In general, for the parameters selected, a maximum Doppler rate of 220 Hz can be tolerated, provided that a processing gain in excess of 64 dB is considered.

Finally, in the previous section, we defined an equivalent squaring loss for the proposed loop. For most practical applications, the squaring loss for a NC-DLL remains less than −1 dB (see Simon, et al.). For the proposed loop, the equivalent squaring loss is in the vicinity of 2 dB, and hence a gain of 3 dB in performance can be expected for the proposed DLL in the absence of user-induced interference. It is imperative to note that a meaningful comparison of CADD-DLL and its NC-DLL counterpart must consider the impact of user-induced interference (i.e., one must conduct a comparative analysis of the two architectures in the framework established here).

VIII. APPENDIX A

In this Appendix, we characterize the noise and interference sequences n(m) and I(m). Note that we have assumed that I(m) is independent of j and l, since, as will be shown shortly, the second order statistics (which are of importance to our analysis) of I(m) are independent of j and l. We also have $$E\{n^+_{j,l,m}\} = E\{n^-_{j,l,m}\} = 0.$$

Note that $$\mathrm{Re}\{n^\pm_{j,l,m}\} = \int_{(mL-1)T_s+\hat{\tau}_{j,l}\pm\frac{T_c}{2}}^{(mL)T_s+\hat{\tau}_{j,l}\pm\frac{T_c}{2}} \mathrm{Re}\{\tilde{z}(t)\}\mathrm{Re}\left\{PN_j\left(t-\hat{\tau}_{j,l}\mp\frac{T_c}{2}\right)\right\}dt + \int_{(mL-1)T_s+\hat{\tau}_{j,l}\pm\frac{T_c}{2}}^{(mL)T_s+\hat{\tau}_{j,l}\pm\frac{T_c}{2}} \mathrm{Im}\{\tilde{z}(t)\}\mathrm{Im}\left\{PN_j\left(t-\hat{\tau}_{j,l}\mp\frac{T_c}{2}\right)\right\}dt \quad (78)$$

and

-continued $$\text{Im}\{n_{j,l,m}^{\pm}\} = \int_{(mL-1)T_s+\hat{\tau}_{j,l}\pm\frac{T_c}{2}}^{(mL)T_s+\hat{\tau}_{j,l}\pm\frac{T_c}{2}} \text{Im}\{\tilde{z}(t)\}\text{Re}\left\{PN_j\left(t-\hat{\tau}_{j,l}\mp\frac{T_c}{2}\right)\right\}dt - \quad (79)$$

$$\int_{(mL-1)T_s+\hat{\tau}_{j,l}\pm\frac{T_c}{2}}^{(mL)T_s+\hat{\tau}_{j,l}\pm\frac{T_c}{2}} \text{Re}\{\tilde{z}(t)\}\text{Im}\left\{PN_j^*\left(t-\hat{\tau}_{j,l}\mp\frac{T_c}{2}\right)\right\}dt.$$

Provided that $$\int_{(mL-1)T_s+\hat{\tau}_{j,l}\pm\frac{T_c}{2}}^{(mL)T_s+\hat{\tau}_{j,l}\pm\frac{T_c}{2}} PN_j\left(t-\hat{\tau}_{j,l}+\frac{T_c}{2}\right)PN_j^*\left(t-\hat{\tau}_{j,l}-\frac{T_c}{2}\right)dt \approx 0$$

(see Equation (34)), $$E\{\text{Re}\{\tilde{z}(t_1)\}\text{Re}\{\tilde{z}(t_2)\}\} = E\{\text{Im}\{\tilde{z}(t_1)\}\text{Im}\{\tilde{z}(t_2)\}\} = \frac{N_0}{2}\delta(t_1-t_2),$$

$E\{\text{Im}\{\tilde{z}(t_1)\}\text{Re}\{\tilde{z}(t_2)\}\}=0$, and the fact that the I & Q PN codes are nearly orthogonal, it can readily be shown that $$\sigma_n^2 = E\{(\text{Re}\{n_{j,l,m}^+\})^2\} = E\{(\text{Re}\{n_{j,l,m}^-\})^2\} = E\{(\text{Im}\{n_{j,l,m}^+\})^2\} \quad (80)$$

$$= E\{(\text{Im}\{n_{j,l,m}^-\})^2\} = N_0 T_s \int_{-\infty}^{\infty} P_{RC}(t)\,dt,$$

and $$E\{\text{Re}\{n_{j,l,m}^+\}\text{Re}\{n_{j,l,m}^-\}\} = E\{\text{Im}\{n_{j,l,m}^+\}\text{Im}\{n_{j,l,m}^-\}\} \approx 0. \quad (81)$$

Similarly (orthogonal I & Q PN codes), $$E\{\text{Im}\{n_{j,l,m}^{\pm}\}\text{Re}\{n_{j,l,m}^{\pm}\}\} \approx 0. \quad (82)$$

Moreover, $$E\{\text{Re}\{n_{j,l,m}^{\pm}\}\text{Re}\{n_{j,l,n}^{\pm}\}\} = E\{\text{Im}\{n_{j,l,m}^{\pm}\}\text{Im}\{n_{j,l,n}^{\pm}\}\} \quad (84)$$

$$= E\{\text{Im}\{n_{j,l,m}^{\pm}\}\text{Re}\{n_{j,l,n}^{\pm}\}\} = 0;\; n \neq m,$$

since the additive $\tilde{z}(t)$ noise is white. Hence, n(m) may be regarded as a white Gaussian sequence whose variance is given by $$E\{n(m)^2\} = 4N_0 T_s \left(E\left\{\left|\hat{d}_m^{(j)}\hat{C}_m^{(j,l)}\right|^2\right\}\right) = 4N_0 T_s (R_c^{(j,l)}(0) + \sigma_{a_e}^2) \quad (84)$$

where we have used the following identities:

$$E\left\{\left(\text{Re}\left\{\hat{C}_m^{(j,l)}\hat{d}_m^{(j)}\right\}\right)^2\right\} + E\left\{\left(\text{Im}\left\{\hat{C}_m^{(j,l)}\hat{d}_m^{(j)}\right\}\right)^2\right\} =$$

$$E\left\{\left|\hat{C}_m^{(j,l)}\hat{d}_m^{(j)}\right|^2\right\} = E\left\{\left|\hat{C}_m^{(j,l)}\right|^2\right\} = E\{(|C_m^{(j,l)}|-a_e)^2\} = R_c^{(j,l)}(0) + \sigma_{a_e}^2$$

and $$\int_{-\infty}^{\infty} P_{RC}(t)\,dt = 1.$$

When large processing gains are used and the PN code may be regarded as a random code, we also have $$E\{\Gamma_{j,k,m,q}^+(t_1,t_2)(\Gamma_{j,k,n,s}^-(t_1,t_2))^*\} \approx 0;\; |t_1-t_2| > T_c;$$

for all j, k, n, and m, and when q and s are selected from the set $\{1,2\}$ (see Equation (10) and Equation (10)). Note that + and − in the above correspond to out-phase partial auto-correlation or partial cross-correlation functions obtained when the reference code is either shifted by $$+\frac{T_c}{2} \text{ or } -\frac{T_c}{2},$$

leading to a separation between correlations of $T_c$ seconds. This in turn produces a pair of random variables that are approximately zero-mean and independent. Moreover, since the I & Q PN codes are assumed orthogonal (see Equation (17)), $$E\{(\text{Im}\{I_{j,l,m}^{\pm}\})^2\} = E\{(\text{Re}\{I_{j,l,m}^{\pm}\})^2\} = \frac{\sigma_{I^{\pm}}^2}{2} = \frac{\sigma_I^2}{2}.$$

In view of the above, $$E\{I(m)I(n)\} = 2\sigma_I^2(R_c^{(j,l)}(0) + \sigma_{a_e}^2)\delta[n-m].$$

IX. APPENDIX B

In this Appendix, we characterize s(m). We note that $$\Gamma_{j,j,m,2}^{\pm}(T_c\tau_e, 0)$$

and $$\Gamma_{j,j,n,2}^{\pm}(T_c\tau_e, 0),$$

where n≠m, are a pair of independent random variables when PN codes with large periods are used and $P_g \gg 1$. Also, we note that $$\text{Im}\{\Gamma_{j,j,m,2}^+(T_c\tau_e, 0) - \Gamma_{j,j,m,2}^-(T_c\tau_e, 0)\} \approx 0$$

due to uncorrelated I and Q spreading, see Equation (11) and Equation (33), which also leads to the following approximation:

$$E\{\text{Re}\{\Gamma_{j,j,m,2}^{\pm}(T_c\tau_e, 0)\}\text{Im}\{\Gamma_{j,j,m,2}^{\pm}(T_c\tau_e, 0)\} \mid \tau_e\} \approx 0$$

(see also Equation (32) and Equation (33)). Then, $$E\{s(m,\tau_e)s(n,\tau_e) \mid \tau_e\} = (\beta_r^2(\tau_e)E\{(\text{Re}\{\Gamma_{j,j,m,2}^+(T_c\tau_e, 0) - \quad (85)$$

$$(\Gamma_{j,j,m,2}^-(T_c\tau_e, 0)\})^2 \mid \tau_e\} +$$

$$\beta_i^2(\tau_e)E\{(\text{Im}\{\Gamma_{j,j,m,2}^+(T_c\tau_e, 0) -$$

$$(\Gamma_{j,j,m,2}^-(T_c\tau_e, 0)\})^2\} - g^2(\tau_e))\delta[n-m].$$

$$g^2(\tau_e))\delta[n-m]. \quad (85)$$

We can further simplify this by noting that $$\text{Im}\{\Gamma^+_{j,j,m,2}(T_c\tau_e, 0) - \Gamma^-_{j,j,m,2}(T_c\tau_e, 0)\} \approx 0,$$

which leads to $$E\{s(m, \tau_e)s(n, \tau_e) \mid \tau_e\} \approx \tag{86}$$

$$(\beta_r^2(\tau_e)E\{(\text{Re}\{\Gamma^+_{j,j,m,2}(T_c\tau_e, 0) - \Gamma^-_{j,j,m,2}(T_c\tau_e, 0)\})^2 \mid \tau_e\}g^2(\tau_e))$$

$$\delta[n-m].$$

$$g^2(\tau_e))\delta[n-m]. \tag{86}$$

Since (see Equation (35), Equation (38), and Equation (40))

$$\text{Re}\{\Gamma^+_{j,j,m,2}(T_c\tau_e, 0) - \Gamma^-_{j,j,m,2}(T_c\tau_e, 0)\} \approx \frac{g(\tau_e)}{\beta_r}, \tag{87}$$

we arrive at $$E\{s(m,\tau_e)s(n,\tau_e)|\tau_e\} \approx 0. \tag{88}$$

X. APPENDIX C

In this Appendix, we derive an expression for $\sigma_{I^\pm}^2$ which is given by $$\sigma_{I^\pm}^2 = E\{|I^\pm_{j,l,m}|^2\} \tag{89}$$

$$= \sum_{k=1;k\neq j}^{N_u} \sum_{q=1}^{s_k} \{E[|\Gamma^\pm_{j,k,m,1}(\tau_{k,q}, \hat{\tau}_{j,l})|^2] +$$

$$E[|\Gamma^\pm_{j,k,m,2}(\tau_{k,q}, \hat{\tau}_{j,l})|^2]\}R_c^{(k,q)}(0) +$$

$$\sum_{q=1;q\neq l}^{s_j} \{E[|\Gamma^\pm_{j,j,m,1}(\tau_{j,q}, \hat{\tau}_{j,l})|^2] +$$

$$E[|\Gamma^\pm_{j,j,m,2}(\tau_{j,q}, \hat{\tau}_{j,l})|^2]\}R_c^{(j,q)}(0).$$

To arrive at the desired expression, we consider a scenario where the in-phase and quadrature phase PN codes used for all signals possess partial cross- and out-of-phase auto-correlation functions which have identical statistical properties. Moreover, we assume that the partial auto-correlation function of all codes used here (when timing error is less than a chip interval) exhibit identical statistical characteristics. This assumption is somewhat justified in practice by combining user-dependent long Gold codes with universal short I&Q spreading codes to form independent I and Q PN codes for each user, as is suggested by EIA/TIA IS-95 CDMA standards. In general, this leads to an approximate result, which has been shown to be exact for random codes [see M. Pursley. Performance evaluation of phase-coded spresd-spectrum multiple-access communication-part I: System analysis. *IEEE Transactions on Communications*, COM-25, No. 8:795–799, August 1977 (hereinafter referred to as "Pursley")]. That is, if one assumes random spreading codes, then the above assumptions hold. Given this critical assumption, and assuming $\tau_{j,l}=0$ we have ($j\neq k$)

$$\Lambda_{1,1} = E[|\Gamma^\pm_{j,k,m,1}(\tau_{k,q}, 0)|^2] =$$

$$4E\left[\left(\int_{(m-1)T_s\pm\frac{T_c}{2}}^{(m-1)T_s+\tau_{k,q}} \text{Re}\{PN_k(t-\tau_{k,q})\}\text{Re}\left\{PN_j^*\left(t\mp\frac{T_c}{2}\right)\right\}dt\right)^2\right]$$

and $$\Lambda_{1,2} = E[|\Gamma^\pm_{j,k,m,2}(\tau_{k,q}, 0)|^2]$$

$$= 4E\left[\left(\int_{(m-1)T_s\pm\tau_{k,q}}^{mT_s+\frac{T_c}{2}} \text{Re}\{PN_k(t-\tau_{k,q})\}\text{Re}\left\{PN_j^*\left(t\mp\frac{T_c}{2}\right)\right\}dt\right)^2\right]$$

where $\text{Re}\{x\}$ denotes the real part of x and $E\{\ \}$ is the expected value of the enclosed with respect to $\tau_{k,q}$ and the random symbols of the PN code. We emphasize that the representation of the above expectation in terms of the real part of the complex spreading PN code is entirely arbitrary and is a direct consequence of the above assumptions. For j=k and q≠1, the expectation is over the duration of the multipath delay profile for the jth signal. Namely, $$\Lambda_{2,1} = E[|\Gamma^\pm_{j,j,m,1}(\tau_{j,q}, 0)|^2]$$

$$= \frac{4}{T_m}\int_0^{T_m}\left(\int_{(m-1)T_s\pm\frac{T_c}{2}}^{(m-1)T_s+\tau_{j,q}} \text{Re}\{PN_j(t-\tau_{j,q})\}\text{Re}\left\{PN_j^*\left(t\mp\frac{T_c}{2}\right)\right\}dt\right)^2 d\tau_{j,q}$$

and $$\Lambda_{2,2} = E[|\Gamma^\pm_{j,j,m,2}(\tau_{j,q}, 0)|^2]$$

$$= \frac{4}{T_m}\int_0^{T_m}\left(\int_{(m-1)T_s\pm\tau_{j,q}}^{mT_s\pm\frac{T_c}{2}} \text{Re}\{PN_j(t-\tau_{j,q})\}\text{Re}\left\{PN_j^*\left(t\mp\frac{T_c}{2}\right)\right\}dt\right)^2 d\tau_{j,q}$$

where we have assumed a uniform distribution (worst case scenario) for the delay profile with $T_m\leq T_s$ denoting the maximum delay spread. Using the result in Pursley, and considering the above assumptions, we have $$\Lambda_{1,1} + \Lambda_{1,2} = \Lambda_{2,1} + \Lambda_{2,2} \approx 4P_g T_c^2 \int_{-\infty}^{\infty}|P_{RC}(f)|^2 df = \frac{4T_s^2 v}{P_g} \tag{90}$$

where $P_{RC}(f)$ is the Fourier transform of $P_{RC}(t)$, given by $$P_{RC}(f) = \begin{cases} 1, & 0\leq |f|\leq \frac{1-\alpha}{2} \\ \frac{1}{2}\left\{1+\cos\left[\frac{\pi}{2}\left(|f|-\frac{1-\alpha}{2}\right)\right]\right\}, & \frac{1-\alpha}{2}\leq |f|\leq \frac{1+\alpha}{2} \\ 0, & |f|\geq \frac{1+\alpha}{2}. \end{cases} \tag{91}$$

The parameter v, given by $$v = \int_{-\infty}^{\infty}|P_{RC}(f)|^2 df,$$

is dependent upon the chip pulse shape alone and can be obtained numerically. Hence, $$\sigma_{I^\pm}^2 = \sigma_I^2 \leq \frac{4T_s^2 v}{P_g}P_{max}\eta(N_u s_{max} - 1)$$

where $P_{max}=\max\{P_{k,q};$ for all k and q$\}$ and $s_{max}=\max\{s_{k,q};$ for all k and q$\}$.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A channel-aided, decision-directed delay-locked loop, comprising:

a PN code acquisition system; and a channel-aided, decision-directed PN code tracking loop coupled to the PN code acquisition system, the channel-aided, decision-directed PN code tracking loop including a loop filter and providing an error signal for use in PN code tracking, the error signal is equal to:

$$ER(\tau \tau_r^{(j,l)}) = F(p)\text{Re}\left\{\sum_{n=-\infty}^{\infty} \Lambda(n)P(t-nT_s)\right\}$$

where p is a heaviside operator, P(t) denotes a data symbol for a jth transmitted signal in the nth signaling interval, Re{x} is the real part of x, $\tau_e^{(j,l)} = \tau j, l - \hat{\tau} j, l / Tc$ denotes a timing error for the lth path of a jth signal, F(p) is the transfer function of the loop filter, and F(p) x(t) is a convolution operation between x(t) and the impulse response of the filter F(p).

2. A channel-aided, decision-directed delay-locked loop as defined in claim 1, wherein the error signal controls a voltage controlled oscillator.

* * * * *